(12) United States Patent
Chai

(10) Patent No.: US 7,526,495 B2
(45) Date of Patent: *Apr. 28, 2009

(54) REAL-TIME CONSTRUCTION OF A SELECTION REPRESENTATION FOR ITEMS IN TREE STRUCTURES

(75) Inventor: Mu Chai, Bellevue, WA (US)

(73) Assignee: EMC Corporation, Hopkinton, MA (US)

( * ) Notice: Subject to any disclaimer, the term of this patent is extended or adjusted under 35 U.S.C. 154(b) by 242 days.

This patent is subject to a terminal disclaimer.

(21) Appl. No.: 11/325,689

(22) Filed: Jan. 4, 2006

(65) Prior Publication Data

US 2007/0162477 A1 Jul. 12, 2007

Related U.S. Application Data

(63) Continuation-in-part of application No. 11/324,593, filed on Jan. 3, 2006.

(51) Int. Cl.
G06F 17/00 (2006.01)

(52) U.S. Cl. .................. 707/101; 707/100; 707/102; 715/841; 715/853; 715/854

(58) Field of Classification Search .............. 707/100, 707/101, 102; 715/841, 853, 854
See application file for complete search history.

(56) References Cited

U.S. PATENT DOCUMENTS

| | | | |
|---|---|---|---|
| 5,537,630 A * | 7/1996 | Berry et al. ............... 715/763 |
| 5,895,474 A | 4/1999 | Maarek et al. |
| 6,216,134 B1 | 4/2001 | Heckerman et al. |
| 6,407,761 B1 * | 6/2002 | Ching et al. ............... 715/835 |
| 6,437,804 B1 * | 8/2002 | Ibe et al. ................... 715/736 |
| 6,462,762 B1 | 10/2002 | Ku et al. |
| 6,484,261 B1 * | 11/2002 | Wiegel ...................... 726/11 |
| 6,636,250 B1 * | 10/2003 | Gasser ....................... 715/853 |
| 6,670,973 B1 * | 12/2003 | Hill et al. ................... 715/853 |
| 6,697,363 B1 | 2/2004 | Carr |
| 6,766,365 B1 | 7/2004 | Huang et al. |
| 6,848,078 B1 | 1/2005 | Birsan et al. |
| 7,028,043 B2 * | 4/2006 | Bleizeffer et al. .......... 707/102 |
| 7,155,447 B2 | 12/2006 | Roberge et al. |
| 7,181,684 B2 * | 2/2007 | Chittu et al. ............... 715/514 |
| 7,246,307 B2 | 7/2007 | Arora et al. |
| 7,353,464 B1 * | 4/2008 | Kundu et al. .............. 715/853 |

(Continued)

OTHER PUBLICATIONS

U.S. Appl. No. 11/324,593, filed Jan. 3, 2006, Chai.

(Continued)

*Primary Examiner*—John E Breene
*Assistant Examiner*—Phong Nguyen
(74) *Attorney, Agent, or Firm*—Workman Nydegger

(57) ABSTRACT

Systems and methods for generating a selection representation for items in a tree structure using an include modifier and an exclude modifier. The method exemplarily includes analyzing a first parent node of the first tree structure to determine if the first parent node is an inclusive selection, updating a field of the first parent node with a first node type indicator if the first parent node is an inclusive selection, analyzing a first child node of the first parent node to determine if the first child node is a different selection type than the first parent node, and updating a field of the first child node with a second node type indicator if the first child node is a different selection type than the first parent node.

20 Claims, 15 Drawing Sheets

U.S. PATENT DOCUMENTS

2002/0057269 A1* 5/2002 Barber et al. .............. 345/418
2002/0075325 A1 6/2002 Allor et al.
2002/0087564 A1 7/2002 Khanna et al.
2006/0168515 A1 7/2006 Dorsett et al.
2006/0294118 A1* 12/2006 Lubbers et al. ............ 707/100

OTHER PUBLICATIONS

U.S. Appl. No. 11/465,119, filed Aug. 16, 2006, Chai.
U.S. Appl. No. 11/396,890, filed Apr. 3, 2006, Chai.
U.S. Appl. No. 11/538,320, filed Oct. 3, 2006, Chai.
U.S. Appl. No. 11/380,082, filed Apr. 25, 2006, Chai et al.
U.S. Appl. No. 11/538,327, filed Oct. 3, 2006, Chai.
U.S. Appl. No. 11/396,891, filed Apr. 3, 2005, Chai.
Office Action for U.S. Appl. No. 11/538,320 mailed Feb. 21, 2008.
Office Action for U.S. Appl. No. 11/538,327 mailed Feb. 21, 2008.
U.S. Appl. No. 11/324,593, Mail Date Oct. 17, 2008, Final Office Action.
U.S. Appl. No. 11/465,119, Mail Date Sep. 5, 2008, Pre-Interview first Office Action.
U.S. Appl. No. 11/396,890, Mail Date Aug. 20, 2008, Final Office Action.
U.S. Appl. No. 11/396,891, Mail Date Aug. 20, 2008, Final Office Action.
U.S. Appl. No. 11/538,320, Mail Date Aug. 15, 2008, Final Office Action.
U.S. Appl. No. 11/538,327, Mail Date Aug. 1, 2008, Final Office Action.
U.S. Appl. No. 11/465,119, Mail Date Dec. 8, 2008, Notice of Allowance.
U.S. Appl. No. 11/380,082, Mail Date Dec. 15, 2008, Office Action.
U.S. Appl. No. 11/396,890, mailed Dec. 31, 2008, Office Action.
U.S. Appl. No. 11/383,320, mailed Jan. 5, 2009, Office Action.
U.S. Appl. No. 11/538,327, mailed Jan. 5, 2009, Office Action.
U.S. Appl. No. 11/396,891, mailed Dec. 29, 2008, Office Action.

* cited by examiner

Figure 1
(PRIOR ART)

```
INCLUDE  E:\
EXCLUDE  E:\NewBuild
INCLUDE  E:\NewBuild\dev
EXCLUDE  E:\NewBuild\Dev\nsr
```

Figure 3

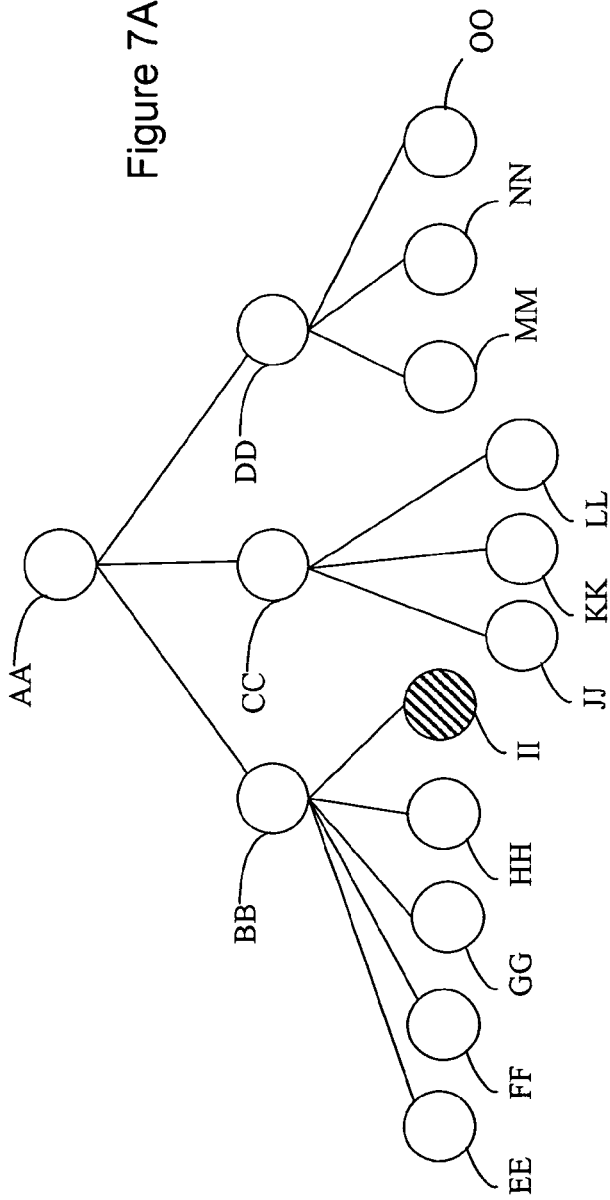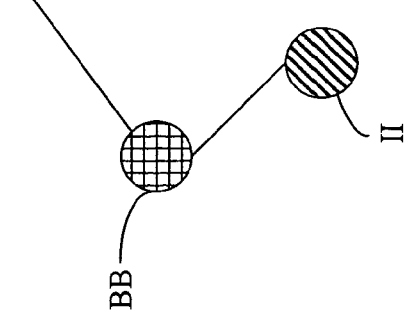
Figure 7A
Figure 7B

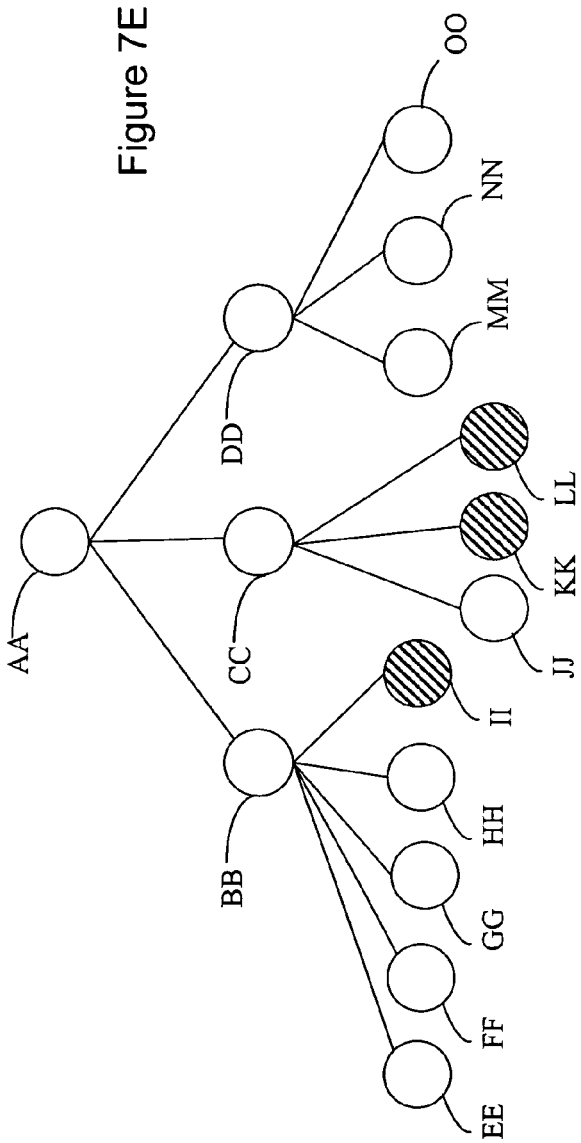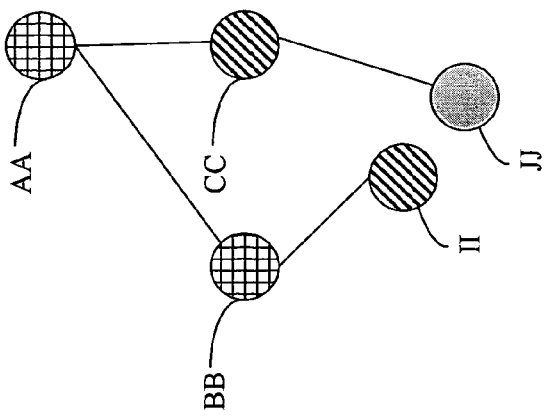

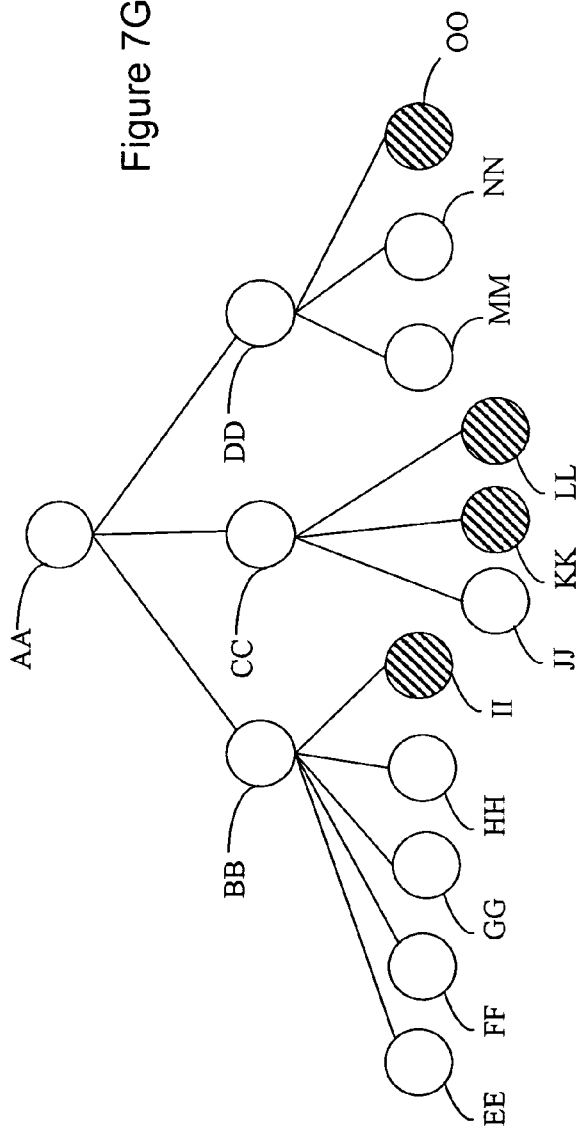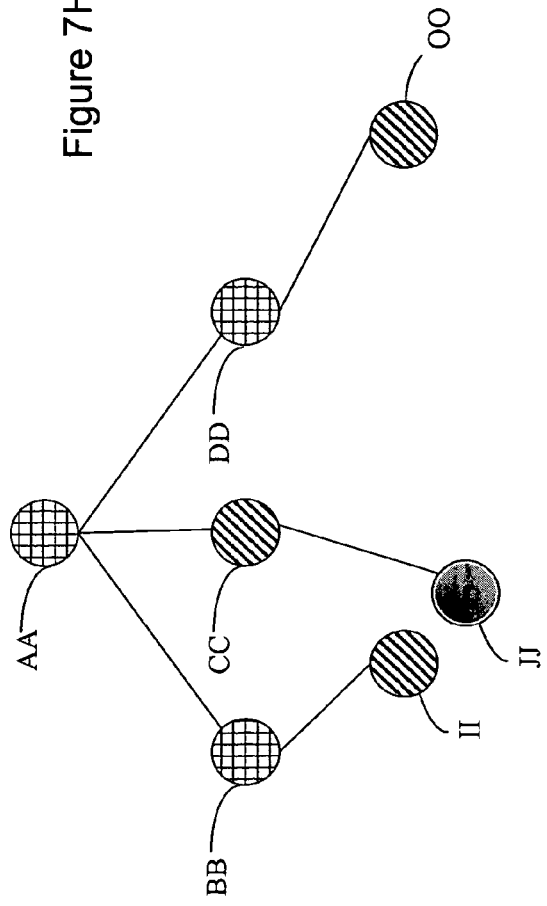

REAL-TIME CONSTRUCTION OF A SELECTION REPRESENTATION FOR ITEMS IN TREE STRUCTURES

CROSS-REFERENCE TO RELATED APPLICATIONS

This is a continuation-in-part application of U.S. patent application Ser. No. 11,324,593, filed Jan. 3, 2006, which application is incorporated herein by reference in its entirety.

BACKGROUND OF THE INVENTION

1. The Field of the Invention

The present invention relates to methods for efficiently generating a selection representation for items in tree-type data structures. More particularly, the present invention relates to systems and methods for real-time construction of selection representations.

2. The Relevant Technology

Tree structures are used extensively in computer science and telecommunications because of the organized manner in which the hierarchical nature of a structure can be depicted in graphical form. The elements of the tree structure have certain terminology. The elements themselves are called "nodes." The lines connecting elements are called "branches." The starting node is often called the "root." A node is a "parent" of another node if it is one step higher in the hierarchy. "Sibling" nodes share the same parent node and are referred to as children of the parent node. Nodes without children are called "end-nodes" or "leaves."

Tree structures are used to depict all kinds of taxonomic knowledge, such as family trees, the Evolutionary tree, the grammatical structure of a language, the way web pages are logically ordered in a web site, etc. In a tree structure there is only one path from any point to any other point. Thus, each element can be defined by a particular path.

In a computer science environment, when a user is allowed to select various elements in a tree structure, the user must explicitly call out which items they choose to select. As can be appreciated, for a very large tree structure, the selection list created can become extensive. Furthermore, because tree structures can have multiple tiers of parent/children nodes, the user may want to select a parent node, but not select one or more children of the parent. This can result in extensive selection lists to accommodate selection and/or deselection of parent, children, grandchildren, great grandchildren nodes, etc.

FIG. 1 illustrates an exemplary selection list for use with a backup system. The user has selected certain files to be included in a backup. Each of the files or elements are represented by an explicit pathway so that a processor will know where in a file system to look for the element. In this exemplary hypothetical, the file system relates to files contained in the E:\ drive. Had the user wanted all of the files in the E drive to be backed up, it would be a simple matter for the selection system to simply list E:\. However, in the embodiment of FIG. 1, the user has determined that certain files are not to be backed up, and hence, the need to explicitly state all of the files that the user requests to be positively selected for saving. As can be seen, the selection list just for the E drive is extensive. When other drives are also considered, it is appreciated that the selection list can become extremely long depending on the number of files selected for backup.

The present invention provides systems and method for creating a selection representation of selected items in a tree structure. One aspect of the invention is a method including analyzing a first parent node of the first tree structure to determine if the first parent node is an inclusive selection, updating a field of the first parent node with a first node type indicator if the first parent node is an inclusive selection, analyzing a first child node of the first parent node to determine if the first child node is a different selection type than the first parent node, and updating a field of the first child node with a second node type indicator if the first child node is a different selection type than the first parent node.

Another aspect of the invention includes a computer system for generating a selection representation of items selected in a first tree structure, the computer system including a file system that stores data using a hierarchy, a graphical user interface that interacts with the file system to present the data in the first tree structure to reflect the hierarchy of the data in the file system and receives input from a user of at least one of (1) positive selections from a user of various items in the first tree structure for performing a predetermined function on the positively selected items, or (2) positive unselections from a user of various items in the first tree structure for excluding from performing a predetermined function on the positively unselected items, a selection module programmed to use the input of the user and generate a selection representation, the selection module operative to (a) analyze a first parent node of the first tree structure to determine if the first parent node is an inclusive selection, (b) update a field of the first parent node with a first node type indicator if the first parent node is an inclusive selection, (c) analyze a first child node of the first parent node to determine if the first child node is a different selection type than the first parent node, and (d) update a field of the first child node with a second node type indicator if the first child node is a different selection type than the first parent node.

Yet another aspect of the invention is a method of providing and selecting items in a first tree structure on the display, the method including retrieving a first tree structure that reflects a hierarchy of data from at least one of memory or storage, displaying the first tree structure on the display, receiving input from a user of at least one of (1) positive selections from a user of various items in the first tree structure for performing a predetermined function on the positively selected items, or (2) positive unselections from a user of various items in the first tree structure for excluding from performing a predetermined function on the positively unselected items, analyzing a first parent node of the first tree structure to determine if the first parent node is an inclusive selection, updating a field of the first parent node with a first node type indicator if the first parent node is an inclusive selection, analyzing a first child node of the first parent node to determine if the first child node is a different selection type than the first parent node, and updating a field of the first child node with a second node type indicator if the first child node is a different selection type than the first parent node.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features will be set forth in the description which follows, and in part will be obvious from the description, or may be learned by the practice of the teaching herein. The features of the teachings herein may be realized and obtained by means of the instruments and combinations particularly pointed out in the appended claims. These and other features will become more fully apparent from the following description and appended claims, or may be learned by the practice of the invention as set forth hereinafter.

BRIEF DESCRIPTION OF THE DRAWINGS

To further clarify the above and other features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 1 illustrates a conventional selection representation listing of items in a tree structure for inclusion in a predetermined function;

FIG. 3 illustrates a selection representation using modifiers according to the present invention;

FIGS. 7A through 7J illustrate exemplary item tree structures and selection representation tree structures;

DETAILED DESCRIPTION OF EXEMPLARY EMBODIMENTS

Figure 2C:
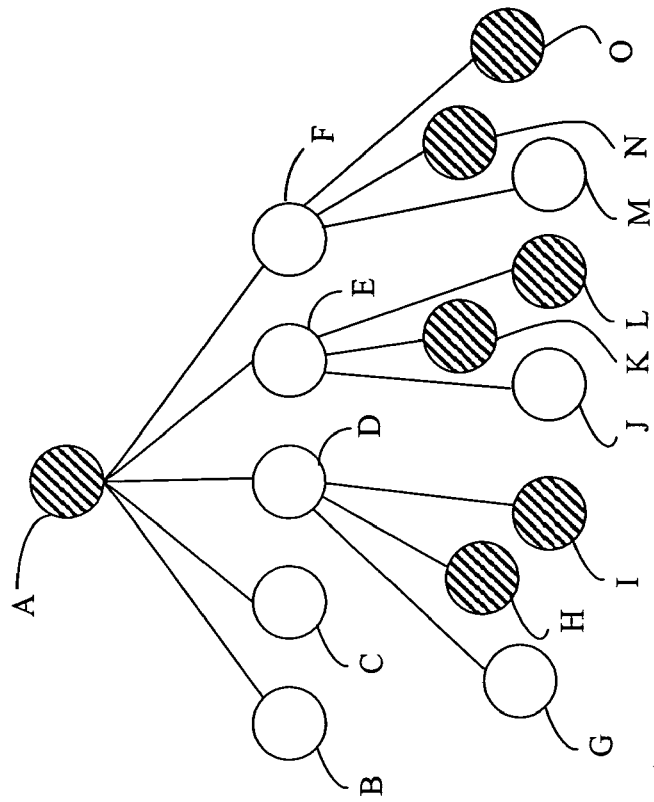
FIGS. 2A through 2C illustrate various embodiments of an inclusive selection according to embodiments of the invention.

The present invention relates to systems and methods for implementing selection processes with data structures organized as a tree structure in which a selection representation is formulated based on novel selection rules. By using the selection rules described herein, parent and children nodes can be expressed using only two modifiers. This tremendously reduces the number of items that must be explicitly expressed to only a few expressed nodes (using the modifiers) that represent the entire set. The selection rules described herein can apply to any list of items organized as a tree structure—that is, any system whose members have a parent-child hierarchical relationship. Such a data structure, like a file system for example, can be generally represented with a tree structure. Normally, when a user desires to perform an action on one or more members of the tree structure, a selection set explicitly recites all parents, children, and/or grandchildren, etc., selected by the user. In most cases, this selection set is not an efficient way to describe the selection. The current invention stipulates a set of rules that dictate what items shall appear in the selection representation to reduce the number of items required to be listed in a selection list and, in most cases, yields the minimal set of items. Further, the present invention provides for real-time construction of the selection representation.

The present invention allows the use of two different selection modifiers to express inclusion and exclusion in a selection representation. In one exemplary embodiment, modifier "include" is used to indicate items that are to be included in the particular predetermined process desired by the user while the modifier "exclude" is used to indicate items in the selection representation that are not to be included in the predetermined process. While the terms "include" and "exclude" are exemplarily used to indicate the two modifiers that will be used in the selection representation, it will be appreciated that any term, alphanumeric string, icon and/or other indicator may be used to signify an "include" modifier and an "exclude" modifier and that these exact terms are not required. Using the FIGS. 2A through 2F, various terminology will now be described.

An inclusive selection exists where (a) where the node itself is positively selected (therefore all of its children are explicitly or implicitly selected) (b) more than half of the node's immediate children are positively selected; or (c) more than half of the node's immediate children are inclusively selected. FIG. 2A illustrates exemplary tree structures having a parent node A and children node B through F to illustrate an "inclusive selection." Note that parent node A may be a child node of another node, but is labeled as a "parent node" in this example to provide a reference point and to distinguish from children nodes B through F. In one embodiment, parent node A may be a "root node."

FIG. 2A illustrates situation (a) of inclusive selection because the parent node A and all of the children nodes B through F are selected as indicated by the shading of the nodes. The situation of FIG. 2A can occur in a couple of different ways. First, a user may positively select all of Nodes A and Nodes B through F. For example, the user can access a user interface and use a selection mechanism which earmarks or tags Node A and Nodes B through F to be positively selected. Second, Node A itself can be positively selected by a user, but none of the children Nodes B through F are positively selected. However, even though none of the children Nodes B through F are positively selected, they are all children of Node A and can be considered to be implicitly selected by virtue of the positive selection of Node A.

Figure 2A:
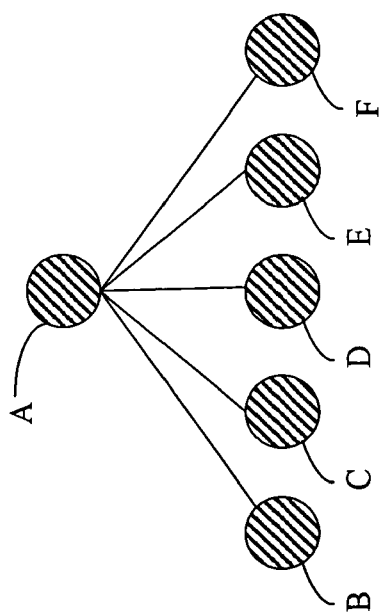
Figure 2B:
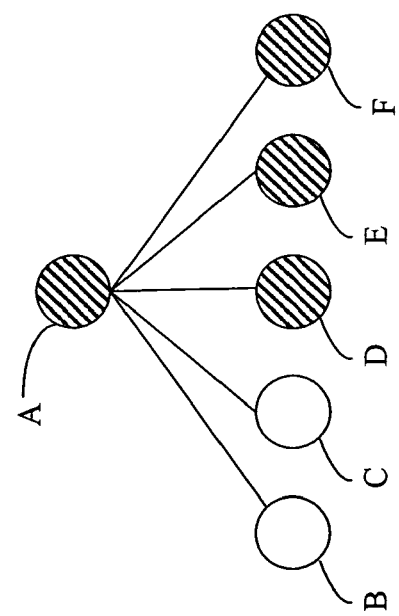

FIG. 2B illustrates situation (b) of inclusive selection. In this embodiment, more than half of the children of parent Node A are positively selected as indicated by the shading of the nodes. In one embodiment, Node A can also be positively selected, with children nodes B, C and E being positively selected as well. In another embodiment, only children nodes B, C and E are positively selected with Node A being implicitly selected by the positive selection of more than half of its children.

FIG. 2C illustrates situation (c) of inclusive selection. In this embodiment, more than half of children Nodes B through F are inclusively selected. That is, as shown in FIG. 2C, Nodes D through F each have three grandchildren nodes (with respect to parent Node A), with a majority of the grandchildren nodes for each child nodes D through F being positively selected so that the child nodes D through F are implicitly selected or "inclusively selected." Therefore, parent Node A can also be implicitly selected. In another embodiment, parent Node A may also be positively selected, with the selected grandchildren nodes being positively selected as well.

An exclusive selection exists where (a) where the node itself is explicitly unselected (therefore all of its children are positively or implicitly unselected) (b) less than half of the node's immediate children are selected; or (c) more than half of the node's immediate children are exclusively selected. FIG. 2D illustrates exemplary tree structures having a parent node A and children node B through F to illustrate an "exclusive selection." Note that parent node A may be a child node of another node, but is labeled as a "parent node" in this example to provide a reference point and to distinguish from children nodes B through F.

FIG. 2D illustrates situation (a) of exclusive selection because the parent node A as well as all of the children nodes B through F are unselected.

Figure 2F:
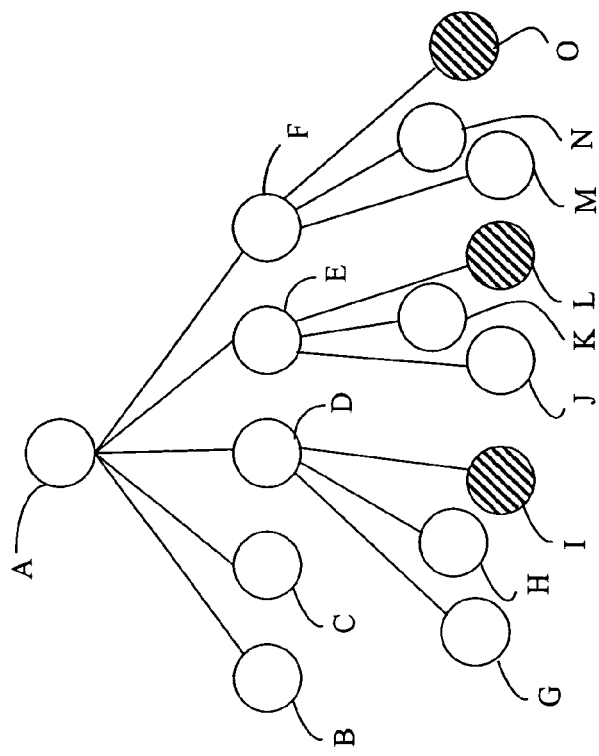
FIGS. 2D through 2F illustrate various embodiments of an exclusive selection according to embodiment of the invention.
Figure 2D:
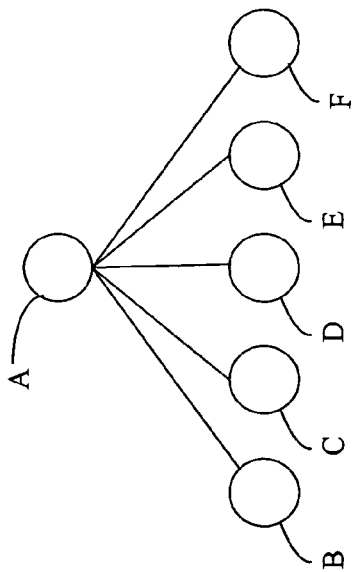
Figure 2E:
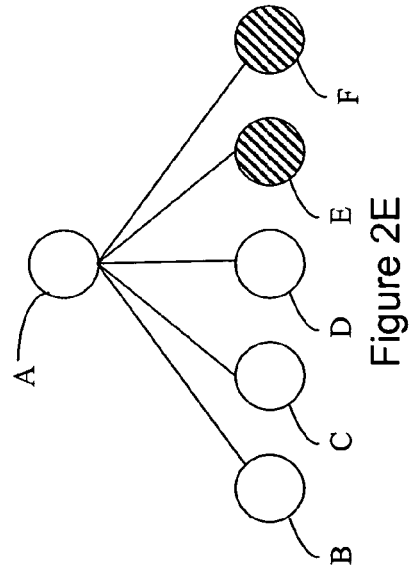

FIG. 2E illustrates situation (b) of exclusive selection because the parent node A is unselected and less than half of the children nodes of a root node are selected. In one embodiment, a user may positively select parent node A and then positively select less than half of the children nodes B through F belonging to parent node A. However, because less than half of the children of parent node A are positively selected, parent node A is implicitly unselected. Thus, positive selection of less than half of the children of a root node results in explicit or implicit exclusion of the root node.

FIG. 2F illustrates situation (c) of exclusive selection. In this embodiment, less than half of children Nodes B through F are exclusively selected. That is, as shown in FIG. 2F, Nodes D through F each have three grandchildren nodes (with respect to parent Node A), with a minority of the grandchildren nodes for each child nodes D through F being positively selected so that the child nodes D through F are implicitly unselected or "exclusively selected." Therefore, parent Node A can also be explicitly or implicitly unselected.

The embodiments of FIG. 2A through 2F were provided for purposes of illustrating inclusive selection and exclusive selection are not to be considered to be limiting to the scope of the present invention. While each of the embodiments of FIG. 2A through 2F describe selection of a parent node or child node as positive selection, as an alternative to positive selection, in each of these embodiments, Nodes A through F could by default be selected unless they are positively unselected.

The present invention relates to identifying an efficient manner for expressing a selection representation for selected nodes and for efficiently constructing the selection representation. We start with the premise that a "selection representation" is a set of explicit nodes, along with their associated modifier, that describes a user selection unambiguously. "Explicit nodes" are those nodes that will appear in the selection representation while "implicit nodes" are those nodes that will not appear in the selection representation but are implied by their parents in the selection representation. So the possible explicit recitations of nodes can be an explicit node of an inclusive selection using an "include" modifier or an explicit node of exclusive selection using an "exclude" modifier. So, an explicit node of an inclusive selection has an "include" modifier while an explicit node of exclusive selection has an "exclude" modifier.

Thus, a node listed in the selection representation with the modifier "include" indicates that that node and its children, except any nodes that appear in the selection representation with the modifier "exclude," are selected. Conversely, a node listed in the selection representation with the modifier "exclude" indicates that that node and its children, except any nodes that appear in the selection representation with the modifier "include," are unselected. Thus, as implied by the fact that nodes that have a different selection type than its parent will be listed explicitly in the selection representation, along any branch, the explicit nodes should alternate between inclusive selection type and exclusive selection type.

Finally, moving from the root of the tree to the branches, the first positively or implicitly selected node of an inclusive selection is the first explicit node in the selection representation. The same is true for an exclusive selection—that is, the first positively or implicitly selected node in an exclusive selection is the first explicit node in the selection representation. This may seem counterintuitive not to list the first unselected node as the first explicit node for an exclusive selection. However, an exclusion selection, like an inclusive selection, is defined by what it is rather than what it is not.

The following will illustrate how these selection rules may apply to the exemplary embodiments of FIGS. 2A through 2F. The embodiments of FIG. 2A through 2C have illustrated various "inclusive selections" while the embodiments of FIGS. 2D through 2F illustrate "exclusive selection" situations. Thus, the inclusive selection situations of FIG. 2A through 2C are predominantly weighted to including a parent node, but may exclude one or more children nodes. For inclusive selections, the first selected node from the root of the tree is the first explicit node in the selection representation. This may be a positively selected node or an implicitly selected node. Thus, in the embodiments of FIGS. 2A through 2C, in each case, Parent Node A is the first explicit node. An explicit node is represented by its full path and an associated modifier. Thus, the parent node in each of FIGS. 2A through 2C will be listed as Include A:\.

A node that has the same selection type as its parent is an implicit node and does not need to be included in the selection representation. Thus, in FIG. 2A, none of the children nodes B through F need to be listed in the selection representation. Similarly, in FIG. 2B and 2C, none of children nodes D through F need to be listed in the selection representation.

However, a node that has a different selection type from its parent is an explicit node. Thus, in FIG. 2B, children nodes B and C will be explicitly included in the selection representation because they are unselected while parent node A is selected. Thus, the selection representation of FIG. 2B will be:

Include A:\
Exclude A:\B
Exclude A:\C.

With respect to FIG. 2C, a majority of the children nodes of child node D are positively selected (i.e., grandchildren nodes H and I), resulting in node D being implicitly selected. Similarly, a majority of children nodes of child node E and F are also positively selected, resulting in nodes E and F being implicitly selected. Because a majority of children nodes of parent node A are implicitly selected (i.e., children nodes D, E and F), this results in parent node A being implicitly selected. The first explicit node, therefore, is parent node A. A node that has a different selection type from its parent is an explicit node. Therefore, child nodes B and C will be explicitly included in the selection representation. A node that has the same selection type as its parent is an implicit node. Therefore, children nodes D, E and F will not be included in the selection representation. However, because grandchildren nodes G, J and M have a different selection type than their parent nodes D, E and F (which are implicitly selected), then the grandchildren nodes G, J and M will be explicitly expressed in the selection representations. Based on the foregoing, the selection representation for FIG. 2C is expressed as follows:

INCLUDE A:\
EXCLUDE A:\B
EXCLUDE A:\C
EXCLUDE A:\D\G

EXCLUDE A:\E\J
EXCLUDE A:\F\M.

Turning now to the exclusion selections illustrated in FIGS. 2D through 2F, these exclusion selections are predominantly weighted to exclude a parent node, but include one or more children nodes. With regard to FIG. 2D, since the analysis first looks for the first node of inclusion, there being none, none of the nodes will be included in the selection representation.

With respect to FIG. 2E, the first selected nodes are children nodes E and F. Thus, the selection representation with respect to FIG. 2E will be

INCLUDE A:\E
INCLUDE A:\F.

Finally, with respect to FIG. 2F, the first selected nodes are grandchildren nodes I, L and O. Thus, the selection representation for the configuration of FIG. 2F will be:

INCLUDE A:\D\I
INCLUDE A:\E\L
INCLUDE A:\F\O.

Figure 1:
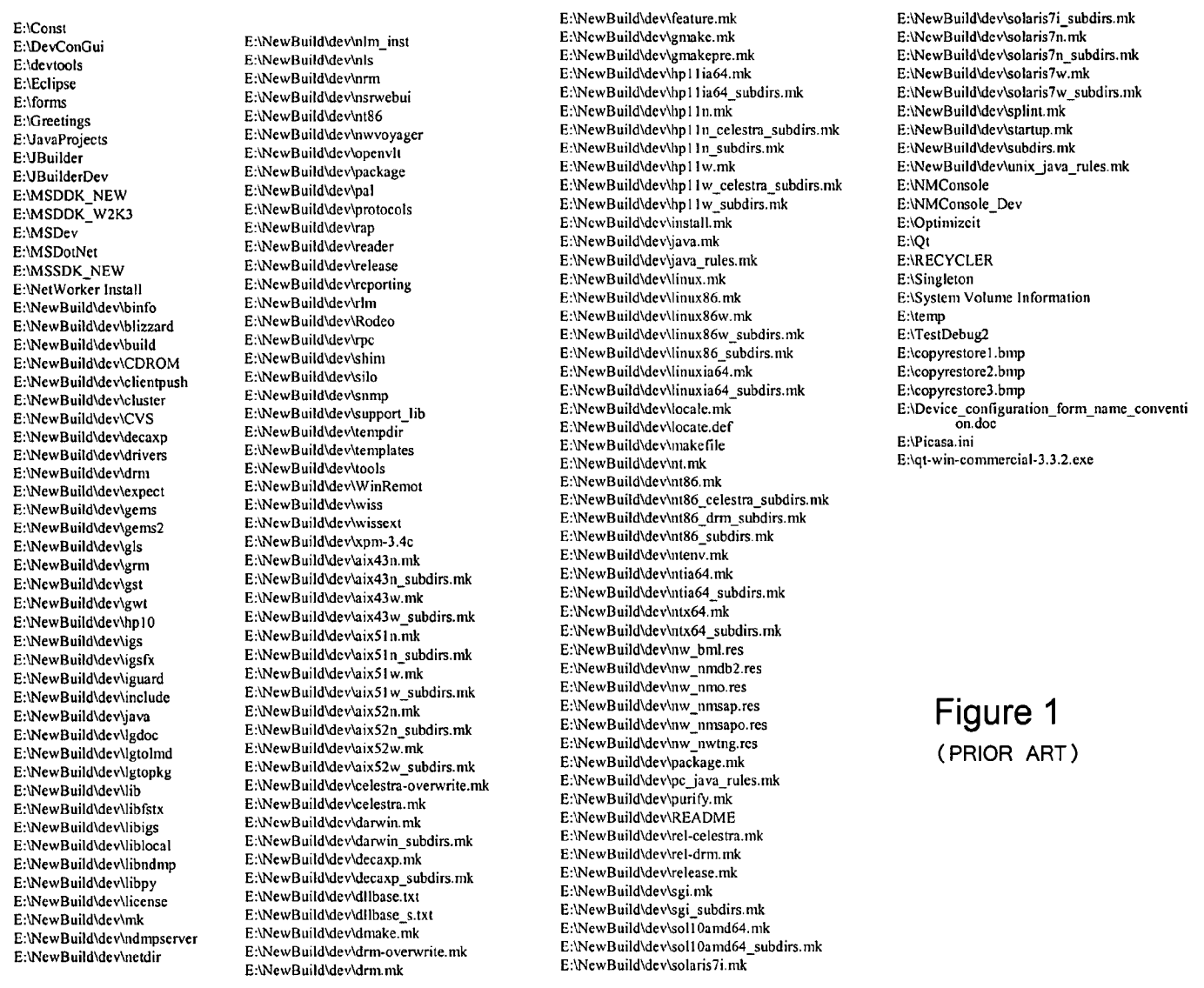

The present invention provides for a reduction in the number of items that are listed in the selection representation, by reducing the listed items using include/exclude modifiers. This method results in less processing time to generate and then use a selection representation to perform a predetermined function. When considering the extent of some tree structure lists, the ability to formulate a selection representation using exclusion/inclusion modifiers can drastically reduce the length of the selection representation in situations where less than half of the children are positively unselected. For a large system, such as a file system, the difference could be significant. FIG. 3 illustrates a selection representation for the same file system selection represented in FIG. 1. As seen, the present invention drastically reduces the number of items listed in the selection representation and also allows for items to be listed by a modifier "include" or "exclude." Whereas, the embodiment of FIG. 1 required all selected items to be listed.

Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where local and remote processing devices perform tasks and are linked (either by hardwired links, wireless links, or by a combination of hardwired or wireless links) through a communications network. In a distributed computing environment, program modules may be located in both local and remote memory storage devices.

Figure 4:
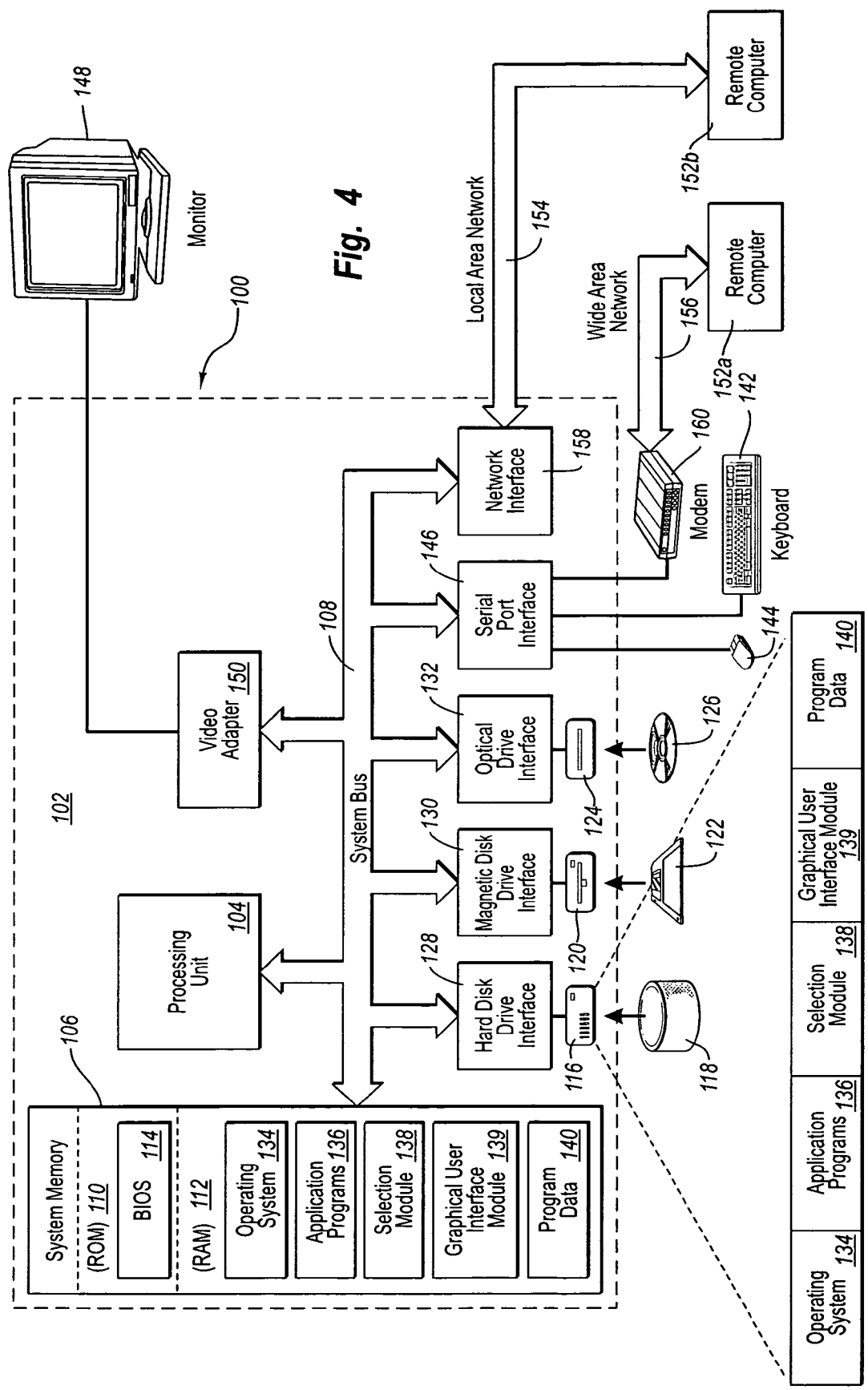
FIG. 4 illustrates an exemplary system for implementing methods of the present invention.

With reference to FIG. 4, an exemplary system 100 for implementing the invention includes a general-purpose computing device in the form of a conventional computer 102, including a processing unit 104, a system memory 106, and a system bus 108 that couples various system components including the system memory 106 to the processing unit 104. The system bus 108 may be any of several types of bus structures including a memory bus or memory controller, a peripheral bus, and a local bus using any of a variety of bus architectures. The system memory includes read only memory (ROM) 110 and random access memory (RAM) 112. A basic input/output system (BIOS) 114, containing the basic routines that help transfer information between elements within the computer 102, such as during start-up, may be stored in ROM 110.

The computer 102 may also include a magnetic hard disk drive 116 for reading from and writing to a magnetic hard disk 118, a magnetic disc drive 120 for reading from or writing to a removable magnetic disk 122, and an optical disc drive 124 for reading from or writing to removable optical disc 126 such as a CD ROM or other optical media. The magnetic hard disk drive 116, magnetic disk drive 120, and optical disc drive 124 are connected to the system bus 108 by a hard disk drive interface 128, a magnetic disk drive-interface 130, and an optical drive interface 132, respectively. The drives and their associated computer-readable media provide nonvolatile storage of computer-executable instructions, data structures, program modules and other data for the computer 102. Although the exemplary environment described herein employs a magnetic hard disk 118, a removable magnetic disk 122 and a removable optical disc 126, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 118, magnetic disk 122, optical disc 126, ROM 110 or RAM 112, including an operating system 134, one or more application programs 136, a selection module 138, a graphical user interface module 139, and program data 140. A user may enter commands and information into the computer 102 through keyboard 142, pointing device 144, or other input devices (not shown), such as a microphone, joy stick, game pad, satellite dish, scanner, or the like. These and other input devices are often connected to the processing unit 104 through a serial port interface 146 coupled to system bus 108. Alternatively, the input devices may be connected by other interfaces, such as a parallel port, a game port or a universal serial bus (USB). A monitor 148 or another display device is also connected to system bus 108 via an interface, such as video adapter 150. In addition to the monitor, personal computers typically include other peripheral output devices (not shown), such as speakers and printers.

The computer 102 may operate in a networked environment using logical connections to one or more remote computers, such as remote computers 152a and 152b. Remote computers 152a and 152b may each be another personal computer, a server, a router, a network PC, a peer device or other common network node, and typically include many or all of the elements described above relative to the computer 102. The logical connections depicted in FIG. 4 include a local area network (LAN) 154 and a wide area network (WAN) 156 that are presented here by way of example and not limitation. Such networking environments are commonplace in office-wide or enterprise-wide computer networks, intranets and the Internet.

When used in a LAN networking environment, the computer 102 is connected to the local network 154 through a network interface or adapter 158. When used in a WAN networking environment, the computer 102 may include a modem 160, a wireless link, or other means for establishing communications over the wide area network 156, such as the Internet. The modem 160, which may be internal or external, is connected to the system bus 108 via the serial port interface 146. In a networked environment, program modules depicted relative to the computer 102, or portions thereof, may be stored in the remote memory storage device. It will be appreciated that the network connections shown are exemplary and other means of establishing communications over wide area network 156 may be used.

Computer 102 can be relatively simple (e.g., a desktop computer) or relatively complex (e.g., a large database server or one of a cluster of servers). The computer may further be a node on a network or a storage device on a storage area network (SAN). Computer 102 may also operate under a different operating system or platform than the server 152a, 152b. In the context of a backup operation, a computer may operate under the control of the server 152a, 152b.

System 100 is not limited to any particular hardware configuration or operating system. Various hardware configurations and operating systems have need of generating selection representations of data prior to performing a predetermined function on the selected items. Therefore, these hardware configurations and operating systems would benefit from the selection representation systems and methods taught herein.

In one exemplary embodiment, application program 136 can be a backup/restore application used for backing up/restoring data stored on computer 102. Computer 102 may communicate with remote computer 152a, 152b, which is a server that contains a backup/restore application. The server 152a, 152b communicates with a backup storage device (not shown) where one or more copies of the data of computer 102 is stored. The computer 102, for instance, has memory 106 or storage 118, 112 or 126 that contains data (including applications, services, and/or volumes). For example, memory 106 or storage 118, 112 or 126 may have data stored in an organized, hierarchical file system. Also, services represent a type of application and may therefore be referred to as applications herein.

The backup/restore application is one example of systems and methods for performing a predetermined function on items in a tree structure, the predetermined function being selectively backing up and/or recovering data. As used herein, the term "data" may include, but is not limited to, directories (e.g., volumes, file systems, and the like), user data, system data, applications, services, operating systems, and the like, that can be stored on one or more storage devices of a computer. Backing up or recovering the operating system may include backing up or recovering any of the data herein defined or understood by those of skill in the art.

The data may be organized as a tree structure having logical directories that do not necessarily correspond to a particular storage device. Even though data may exist on many different storage devices, data can be organized into logical directories and subdirectories so that a user can easily locate information. In one example, in Windows® operating system, the main directories in a tree structure are referred to as volumes. Volumes include, for example, the C drive and D drive, which are typical volumes of storage that are located on a computer, even though the C or D drive itself may comprise a stack of hard disks. It is not necessary for a user to know from which particular disk to obtain information.

Thus, directories exist to help a user navigate through the data on the computer. Other directories may exist to which the computer has access through a network. In addition, as will be described further below, directories and subdirectories can be organized into groupings that can be selected to perform a backup or restore of the data corresponding to the grouping. Each directory, subdirectory, grouping, and individual item in a file system can correspond to a node in a tree structure.

Still other directories in a tree structure may exist specific to a particular function of the computer. For example, in Windows® operating system, certain data related to preserving the operating system state of the computer can be organized into an operating system state volume (herein referred to as the VSS volume). Furthermore, the VSS volume may include other applications and/or services that can be used to restore data on the computer. For a VSS volume, more than one storage device may be involved and the data for the VSS volume may reside in different storage devices of a computer, such as the C drive, D drive and/or other drives. The VSS volume is thus simply a logical organization for locating data, but does not represent an actual set of storage devices. However, in one embodiment, all of the data pertaining to the VSS volume could be located in a single distinct storage device rather than distributed on multiple storage devices on the computer.

The Windows® operating system is used exemplarily herein to describe the present invention. However, it should be appreciated that the systems and methods of backing up and restoring a computer can also apply to other operating systems. For example, other operating systems would typically desire that some or all aspects of an operating system state be backed up. In addition, other operating systems utilize directories or file systems in the form of tree structures to assist a user in navigating through the data residing on a computer. Thus, the term "directory" can be used interchangeably with the term "volume" or "file system" to refer to any means of logically organizing data on a computer in the form of a tree structure.

Typically, a user will choose to select all of the groupings relating to the volumes of a computer or computer to be backed up. However, less than all of the groupings may be selected by the user which specifies that less than all of the data of a computer should be backed up. This may be beneficial where the user knows that changes have occurred only in certain groupings without performing a backup of the entire client data system. A user may select one or more groupings by accessing a user interface that communicates with a backup/restore application (see FIG. 5). Groupings may include information that identifies the items that need to be backed up.

As used herein, the term "user" may refer to a person operating the server 152a, 152b (e.g., administrator). Alternatively, the user may refer to a person at the computer 102. Both types of users would be able to initiate a request for backup or restore, although it will be appreciated that the server 152a, 152b may have additional functionalities not available to the computer 102. A user may establish a schedule that defines the times at which the server 152a, 152b automatically performs a backup operation on the data of computer 102. However, users on the computers can also initiate ad hoc backup operations and recover operations.

The server 152a, 152b typically controls and directs all server-initiated backup operations or processes. The computer controls ad hoc backup and recover operations. The computer data can be organized into a tree structure and displayed on a user interface that communicates with a backup/restore application. In addition, the tree structure hierarchy makes it easier for a user to specify particular volumes or subdirectories to backup. The volumes and subdirectories can also be organized in terms of "groupings," which are herein defined as a collection of data or items that are backed up during a backup session between the server 152a, 152b and a particular client, e.g., computer 102.

A grouping can therefore include an entire volume, less than an entire volume, or data distributed on one or more volumes, the grouping including, but not limited to, a group of files, an entire file system, application-generated data such as a database or operating system information, a single file, and the like. A grouping may also include applications or services or components of applications, services, and/or operating systems distributed on one or more volume. To illustrate one example in which a grouping includes information located on more than one volume, a grouping may encompass information that relates to the operating system state, but which information is located on different volumes. Thus, the term grouping is used as an organizational tool for identifying and locating files that may logically belong together. However, client data can be organized and/or grouped in any suitable manner in a tree structure depending on design considerations, including a combination of groupings and individual files.

Some operating systems include writing components that operate with applications or services in order to store information on a storage device. For example, in Windows® operating system, the writing components are referred to as "writers." Thus, the term "writer" and "writing components" will be used interchangeably to refer to any component that provides this functionality. Further, the writing components can interact with backup/restore hardware and software including snapshot generating hardware and software. Generally, a writer corresponds to at least one application or service to be backed up. The data associated with writers in a grouping may further be located in different volumes, subdirectories, and the like. For example, a writer can store data to more than one volume. In addition, some volumes are not associated with any writers. Thus, it is possible that a grouping could correspond to information stored on a volume that is associated with writers, a volume not associated with any writers, or both.

One or more files on the computer may be related to the operating system state. In one embodiment, as mentioned above, groupings can be used for organizing files related to the operating system state of the computer. For example, Microsoft® provides the Volume Shadow Copy Service and a VSS volume framework can be provided for backing up the operating system state of a computer operating on Windows®. In addition, as mentioned above, the VSS volume includes other applications and/or services that include writers. The VSS volume provides an organizational tool to backup data relating to the operating system state. Saving groupings pertaining to the operating system state of the computer allows a user to recover their operating system and return it to a previous state if needed and can be important where a user loses an operating system drive or the entire machine. Otherwise, the user would have to rebuild their system, reconfiguring services, and reinstalling and reconfiguring applications. The Windows® operating system implementing Volume Shadow Copy Service combined with a logical VSS volume described herein is only an exemplary way of organizing groupings relating to client data. Other operating system platforms can use similar or different methods of organizing groupings for data related to a computer.

Figure 5:
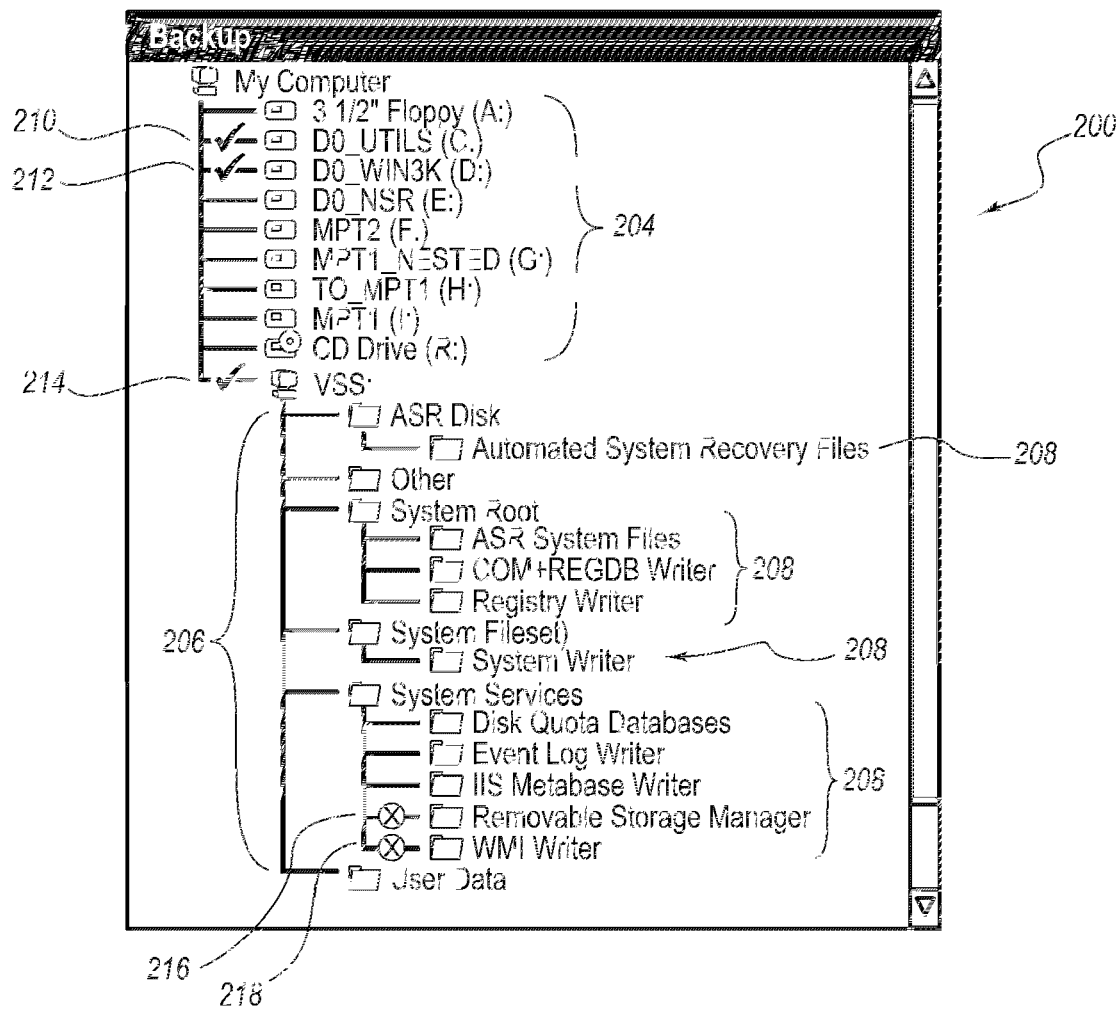
FIG. 5 illustrates an exemplary user interface for implementing methods of the present invention.

Using the example of a Windows® operating system, FIG. 5 illustrates an example of a user interface 200. The user interfaces 200 may be associated with a backup/restore application 136, mentioned above. The user may interact with the user interface 200 to select particular volumes, groupings, and/or files to be saved. Alternatively, the user may simply list the volumes, groupings, and/or files to be backed up without using a user interface. Further, it is possible for the user to select "all" volumes to be backed up. Indeed, where the user is concerned about a consistent backed up operating system state, the user would likely select all volumes, at least the VSS volume, to be backed up.

FIG. 5 illustrates an interface 200 that includes a plurality of volumes 204, each identified by a particular alphanumeric character and commonly referred to as drives (e.g., A: drive, C: drive, D: drive, VSS: drive, and the like). Each volume 204 acts as a parent node in the tree structure illustrated in FIG. 5. Organized under the VSS drive 214 is a plurality of VSS groupings 206 are also provided for backup/restore functions. In this embodiment, VSS groupings 206 act as children to the VSS parent node 214 in the tree structure. In addition, the VSS grouping 206 labeled "VSS System Services" also exemplarily shows operating system writers and writer components 208 that branch as grandchildren nodes to the VSS drive 214.

In one embodiment, groupings 206 are dynamically populated and the content of the groupings 206 may be determined dynamically based in part on which writers are active on the computer. When the writers of a computer are enumerated or identified, writers of the same type become writers in a particular grouping. Thus, the writers associated with a particular grouping have the same type. For example in FIG. 5, the writers 208 each have the same type and are included in the grouping 208. If a writer for a particular application or service is not available (i.e., inactive or nonexistent), the appropriate files may be backed up via the file system when the corresponding volume(s) are selected for backup. For a given backup operation, some of the groupings may include active writers while others may not include any writers.

The above discussion of writers should not be construed to require writers to be associated with every volume or grouping. It is possible for a volume to not be associated with any writers. It is further possible for a grouping not to be associated with any writers if the information corresponding to the grouping is located on a volume that is not associated with writers. Volumes can also be associated with writers, but not associated with any of the groupings related to the operating system state. The groupings 206 and writers 208 are simply illustrates as exemplary children nodes and grandchildren nodes to VSS volume 214 to illustrate one possible user interface selection for implementing the present invention.

In the exemplary tree structure of FIG. 5, a user could select the VSS volume 214, and, unless the user selects or deselects any of the groupings 206 or sub-groupings 208, the entire VSS volume will be backed up. By selecting the VSS volume, the entire operating system state directory including all of the groupings relating to the operating system state will be backed up every time the VSS volume is selected. Having a single parent node earmarked for VSS may be desirable to make it easier for a user to identify, using a single selection (i.e., VSS volume 214), all of the groupings relating to the operating system state to ensure that the operating system state is consistent every time a backup of operating system state data occurs. However, the user is also able to select groupings 206 and/or sub-groupings 208 relating to the operating system state if so desired without being required to select the entire VSS volume 214.

Thus, as shown exemplarily in FIG. 5, the user has positively selected parent nodes C: drive 210, D: drive 212 and the VSS: volume 214. In addition, the user has positively unselected sub-grouping 216 entitled "removable storage manager" 216 and sub-grouping 218 entitled "WMI Writer." Thus, the user interface represents an inclusive selection with respect to parent nodes C: drive 210, D: drive 212 and the VSS: volume 214. The explicit nodes that will appear in the selection representation will be chosen based on the selection rules above which, among others, state that the first selected node of an inclusive selection from the root of the tree will be the first explicit node in the selection representation.

In each case of selected parent nodes C: drive 210, D: drive 212 and VSS: volume 214, the parent node will be the first explicitly listed node. All of the groupings 206 under the VSS volume 214 are implicitly selected since they are not explicitly unselected. Thus, these implicitly selected nodes will not be listed in the selection representation since they have the same selection type as parent node VSS: volume 214. However, the sub-groupings 216, 218 do have a different selection type from parent node VSS: volume 214 since they are both unselected for backup. In addition, more than half of the sub-groupings 208 are selected for inclusion in the backup, the grouping 206 "system services" is implicitly selected. Thus, sub-grouping nodes 216, 218 will be explicitly included in the selection representation. The selection representation for the selected and unselected nodes shown in FIG. 5 is thus as follows:

INCLUDE C:\
INCLUDE D:\
INCLUDE VSS:\
EXCLUDE VSS:\System Services\Removable Store manager
EXCLUDE VSS:\System Services\WMI Writer.

As will be appreciated, this selection representation is much smaller than explicitly listing all of the groupings 206 and subgroupings 208. Furthermore, it will be appreciated that the C: drive 210 and D: drive 212 may consist of potentially hundreds of files, applications, and/or services. The present invention, thus provides for a smaller listing than is possible with conventional system that require explicit listing of all selected nodes.

Figure 6:
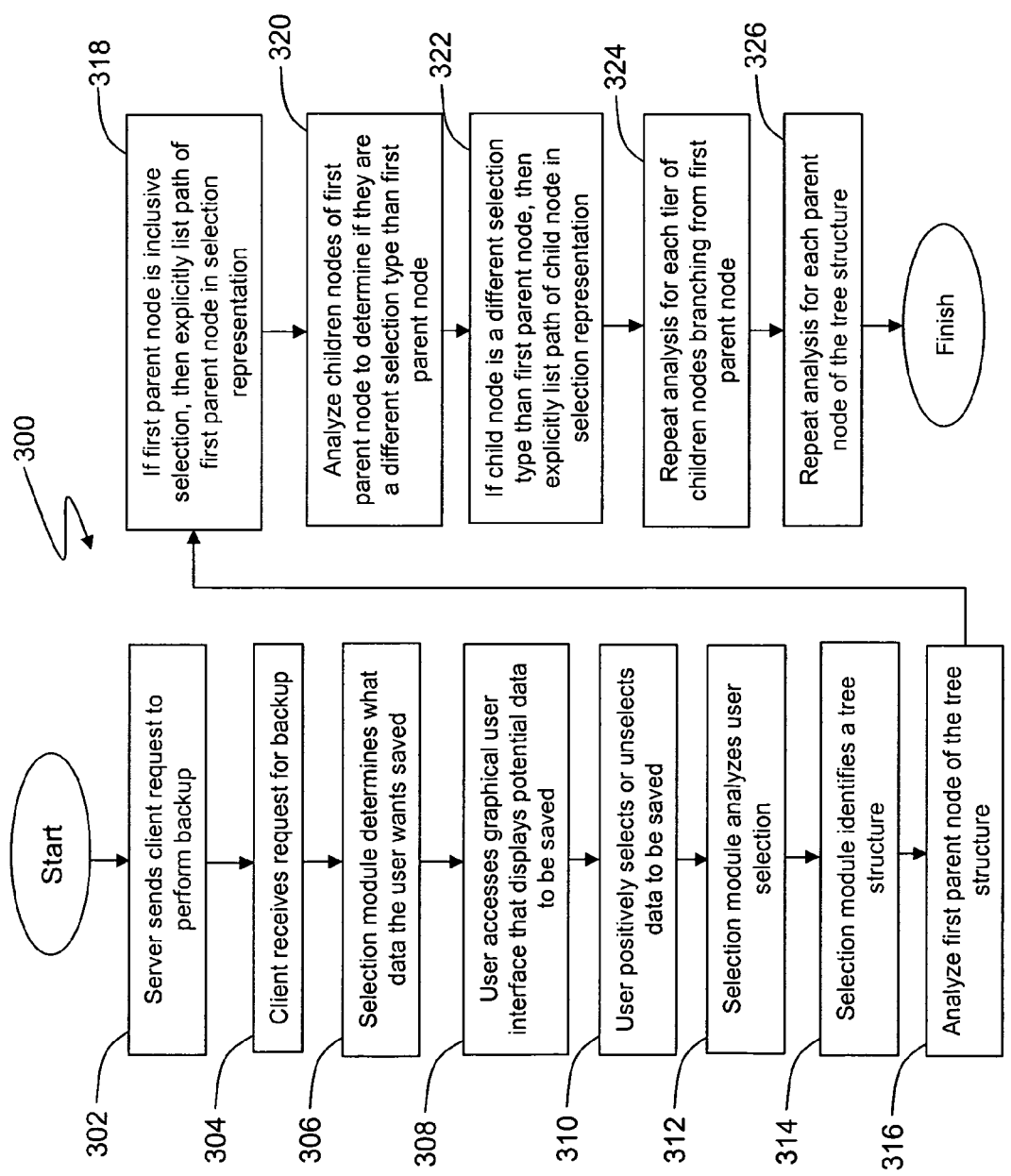
FIG. 6 illustrates an exemplary method of generating selection representations of the present invention.

FIG. 6 illustrates an exemplary method 300 for performing the teachings of the present invention. It will be appreciated that some of the steps of method 300 can be modified, performed in a different order, eliminated, and that additional steps may be added. Exemplarily, the steps of method 300 can be performed using the system 100 of FIG. 4. Thus, the description of the steps of method 300 will be described in the context of system 100, realizing that other systems may be used to perform the steps thereof.

At 302, a server 152*a*, 152*b* sends a backup request to computer 102. At 304, the backup/restore application 136 receives the backup request. At 306, the selection module 138 is initiated to determine what data the user would like to be saved. At 308, the user accesses the graphical user interface module 139 which interacts with the memory 106 or storage 118, 122, 126 in order to display the potential data that can be saved. At 310, the user positively selects or positively unselects various volumes, groupings, files, services, applications, or other data for backup. Note that 308 and 310 can be performed before the backup request is sent from server 152*a*, 152*b*. For example, a user may preselect the data to be backed up in a prescheduled backup configuration.

At 312, the selection module 138 analyzes the user selection. At 314, this can consist of identifying a tree structure having at least one parent node and at least one child node. At 316, the selection module analyzes the root node of the tree structure to determine whether the root node is an inclusive selection type node. As an initial step, the nodes may be analyzed to identify whether each node is an inclusive selection or exclusive selection before determining whether the nodes should be explicitly included in the selection representation. In this manner, an inclusive selection node may be more easily determined.

At 318, if the root node is an inclusive selection type, then the selection module 138 lists explicitly the path of the root node in the selection representation using the "include" modifier. At 320, the selection module 138 analyses the children node of the root node to determine if any of the children nodes are a different selection type than the root node. This is also the case even if the root node is an exclusive selection type because it is possible that some of the children nodes are inclusive selection type. At 322, if any of the children are a different selection type than the root node, selection module 138 lists the path of that node explicitly using an "include" or "exclude" modifier.

By way of example, at 318, if the root node is an inclusive selection type, then the root node will be listed with the include modifier. Then, at 322 if a child node is an exclusive selection type, then the child node will be listed with an exclude modifier. Conversely, at 318, if the root node is an exclusive selection type, the root node will not be included in the selection representation. But, at 322 if a child node is an inclusive selection type, the child node will be listed in the selection representation with an include modifier.

At 324, the process is repeated for each tier of children nodes branching from the root node, including grandchildren nodes and great-grandchildren nodes, etc. At 326, the process is repeated for each root node of the tree structure. Using the foregoing exemplary method, a selection representation will result in which along any branch of the tree structure, the explicit nodes should alternate between inclusive selection type and exclusive selection type because the process analyzes each node of the branch in terms of whether the child node is a different selection type than the parent node from which the child node depends.

As illustrated in FIG. 5, the potential items in the tree structure that can be selected are displayed on the graphical user interface display 200. The user interacts with the interface 200 in order to select the items to be included in the selection representation. The user does not necessarily see the final selection representation. Nor, does the user necessarily see the real-time construction of the selection representation, that takes place as the user is making selections on the interface 200.

Exemplary methods for performing the real time construction of the selection representation include 1) tracking the selection states of the items in the item tree structure, and 2) creating and updating a selection representation tree from which the final selection representation can be easily deduced. In one embodiment, the selection representation tree is separate from the item tree displayed on interface 200. However, in another embodiment, the selection representation tree is an extension of the item tree with the nodes of the item tree being modifiable by adding fields to the item tree structure. However, for clarity, the selection representation tree will be described as separate from the item tree.

FIGS. 7A-7J illustrate various stages of an exemplary scenario of real-time construction of a selection representation. With respect to FIG. 7A, an exemplary item tree is illustrated having a parent node AA and children nodes BB, CC and DD. Node BB has grandchildren nodes EE through II, Node CC has grandchildren nodes JJ through LL, and Node DD has grandchildren nodes MM through OO. Note that the remaining item trees in FIGS. 7A through 7J have a similar configuration, but are just showing different stages of real-time construction of a selection representation tree as a user selects items in the item tree. In the FIG. 7A, a user has made a first selection of positively selecting node II, which node is in the same branch as node BB and parent node AA. Before the selection of node II, none of the nodes of the item tree were positively selected and so, initially, the selection type for each node is set to be exclusively selected and the number of inclusively-selected children is zero for each node.

With the selection of node II, the node II itself, which previously was exclusively selected, is updated to be inclusively selected. Since Node II does not have any children, the parent of node II (i.e., node BB) is analyzed to determine whether the selection type has changed due to the current selection of Node II. Since less than half of the children of node BB are selected, then the selection type of Node BB has not changed and is still exclusively selected. Since the selection type of node BB has not changed, it is not necessary to analyze above node BB.

FIG. 7B illustrates a selection representation tree that corresponds to the selections in the item tree of FIG. 7A. Before any selections are made in the item tree, a selection representation tree is not necessary. However, after selection of the first item and any subsequent item, a selection representation tree is created and updated. The creation and updating of the selection representation tree parallels the selection rules described above. That is, the selection representation tree includes explicit nodes and indicates the selection type of the explicit nodes (i.e., inclusive selection nor exclusive selection). "Explicit nodes" are those nodes that will appear in the selection representation while "implicit nodes" are those nodes that will not appear in the selection representation but are implied by their parents in the selection representation. However, in the selection representation tree, an implicit node may be included as a "connecting node" between the root of the tree and an explicit node.

In one embodiment, the selection module 138 creates and updates the selection representation tree. The selection representation tree is constructed by starting at the root of the tree (e.g., parent node AA) and moving toward the selected node. The selection module 138 analyzes the branch for the first inclusive selection node. If the root node AA is exclusively selected, the root node AA will be included in the selection representation tree as a "connecting node" as indicated by the crossed pattern. Similarly, moving down the branch toward node II, node BB is also not an inclusive node and so will be included in the selection representation tree as a connecting node. Finally, the inclusive node II is added to the selection representation as indicated by the hatched pattern.

Figure 7C:
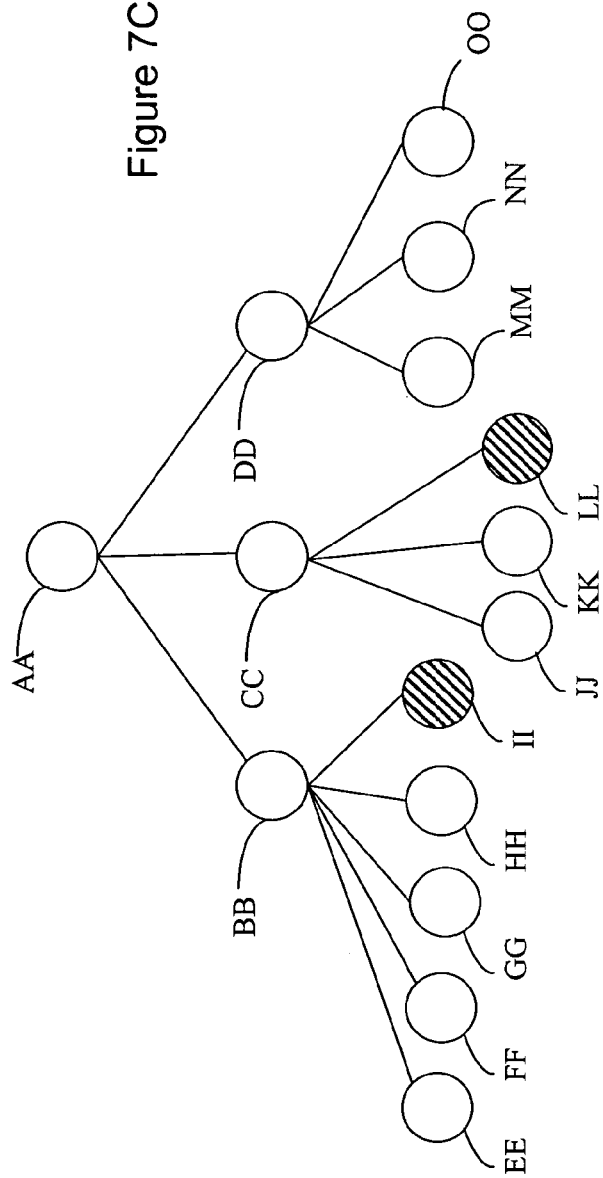

Turning to FIG. 7C, the user in the interface display (exemplarily, interface 200) has positively selected another node LL. Since node LL was previously exclusively selected, the item tree now identifies node LL as inclusively selected. Since node LL does not have any children, the next step is to walk up to the parent node CC to determine if the selection type has changed due to the current selection of Node LL. Since less than half of the children of node CC are selected, then the selection type of node CC has not changed and is still exclusively selected. Further, since the selection type of node CC has not changed, it is not necessary to analyze above node CC.

Figure 7D:
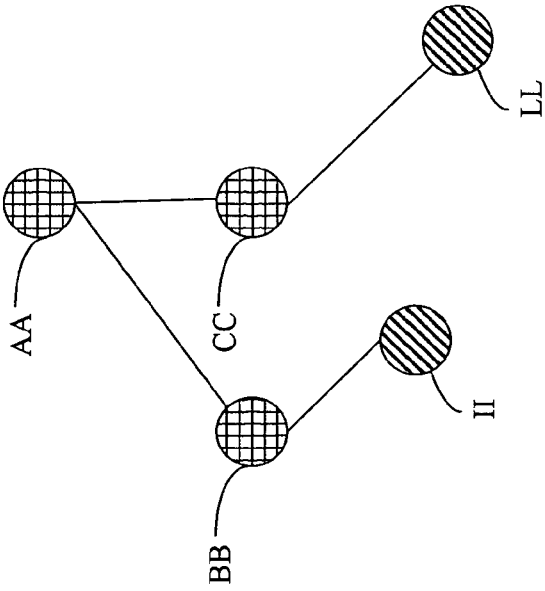

With reference to FIG. 7D, the selection representation tree is updated. If part of the branch of the new selection exists in the selection representation tree, then the selection module 138 will simply build off the existing nodes. Starting at the root node, the selection module 138 builds the branch to the selected node and identifies for the first inclusive selected node. Since the root node AA already existed in the phase of FIG. 7B, then node CC is added and connected to node AA. Both nodes AA and node CC are identified as connecting nodes since neither of them are an inclusive node. Then node LL is added as an explicitly inclusive node.

FIG. 7E illustrates that the user has made yet another selection of node KK. Since node KK was previously exclusively selected, the item tree now identifies node KK as inclusively selected. Since node KK does not have any children, the next step is to walk up to the parent node CC to determine if the selection type has changed due to the current selection of Node LL. In contrast to before, now that more than half of the children nodes of node CC have been positively selected, node CC is now implicitly inclusively selected rather than exclusively selected. The item tree thus notes this change of selection type for node CC. Further, because there has been a change of selection type for node CC, the process walks up one node to parent node AA to determine if there has been any change in selection type for node AA. However, because less than half of the children of parent node AA are inclusively selected, parent node AA is still implicitly exclusively selected. Therefore, no status change for parent node AA is noted.

Turning to FIG. 7F, selection module 138 updates the selection representation tree again, starting at parent node AA. Since the selection type of parent node AA has not changed, the selection module 138 analyzes the children of selection node AA. The selection type of nodes BB and DD have not changed. However, the selection type for node CC has changed now that more than half of the children of node CC are inclusively selected. In other words, node CC is inclusively selected, and so the status is changed in the selection representation from a connecting node to an explicit node. Because the status has changed, any children nodes of a changed node CC are removed. Thus, node LL is removed from the selection representation tree. The selection module 138 looks for children nodes of the changed node CC that are a different selection type than node CC. In this case, node JJ is implicitly exclusively selected. Therefore, node JJ is added to the selection representation tree as an explicitly exclusive node as indicated by the gray shading.

FIG. 7G illustrates the user continuing to make selections on the user interface 200 and newly selecting node OO. The selection of OO does not change the selection type of node DD nor parent node AA. In updating the selection representation tree, shown in FIG. 7H, node DD is added as a connecting node and node OO is added as an explicitly inclusive node.

Figure 7I:
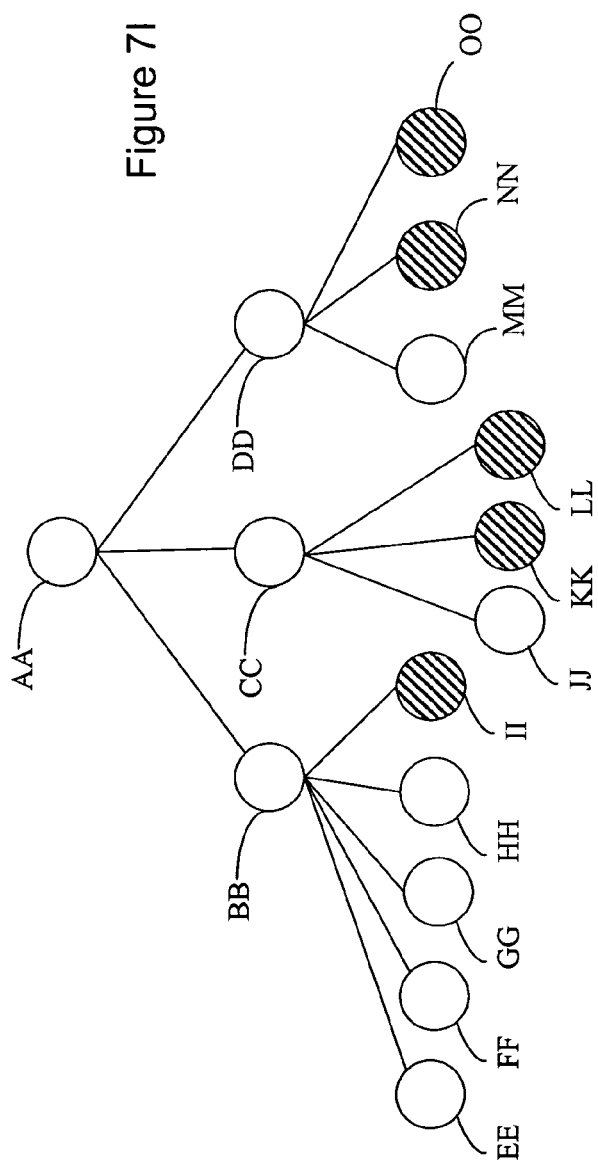
Figure 7J:
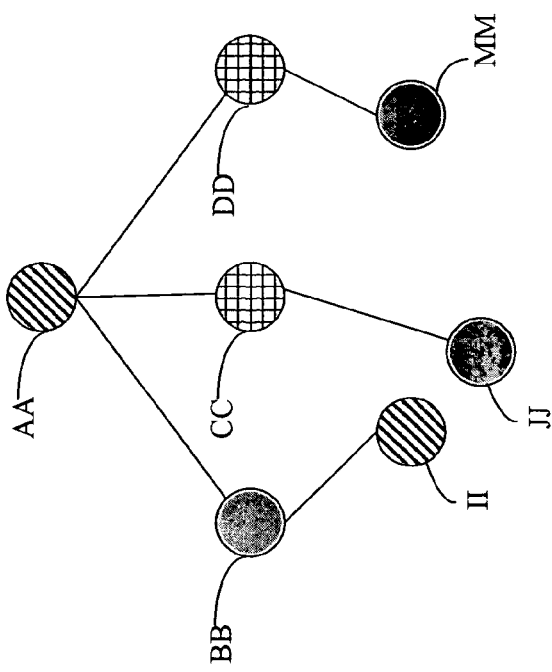

Finally, with reference to FIG. 7I, the user makes a selection of node NN. Selecting node NN changes the selection type of node DD to be implicitly inclusively selected. In addition, the selection type of Node AA is also implicitly inclusively selected. In the updating of the selection representation tree shown in FIG. 7J, the selection module 138 identifies the first explicitly or implicitly inclusive node, which is node AA. Thus, node AA is changed from a connecting node to an explicitly inclusive node. Next, the selection module 138 traverses the children of node AA to identify which of them, if any, has a different selection type. Since node BB is implicitly exclusively selected, node BB is changed from a connecting node to an explicit exclusive node. Nodes CC, which was previously an explicitly inclusive node, is now changed to a connecting node. Node DD remains a connecting node.

The children of Node BB are then analyzed to determine which, if any of them, has a different selection type than node BB. In this case, node II is inclusively selected and explicitly so indicated in the selection representation tree. The children of node CC are also analyzed to determine if any of them has a different selection type than node AA (since node CC is the same selection type as node AA). In this case, node JJ is implicitly exclusively selected and so is indicated as explicitly exclusively selected in the selection representation tree. Finally, the children of node DD are analyzed to determine which, if any, is a different selection type than node AA (since node DD is the same selection type as node AA). In this case, node MM is implicitly exclusively selected and so is indicated as explicitly exclusively selected in the selection representation tree.

Figure 8:
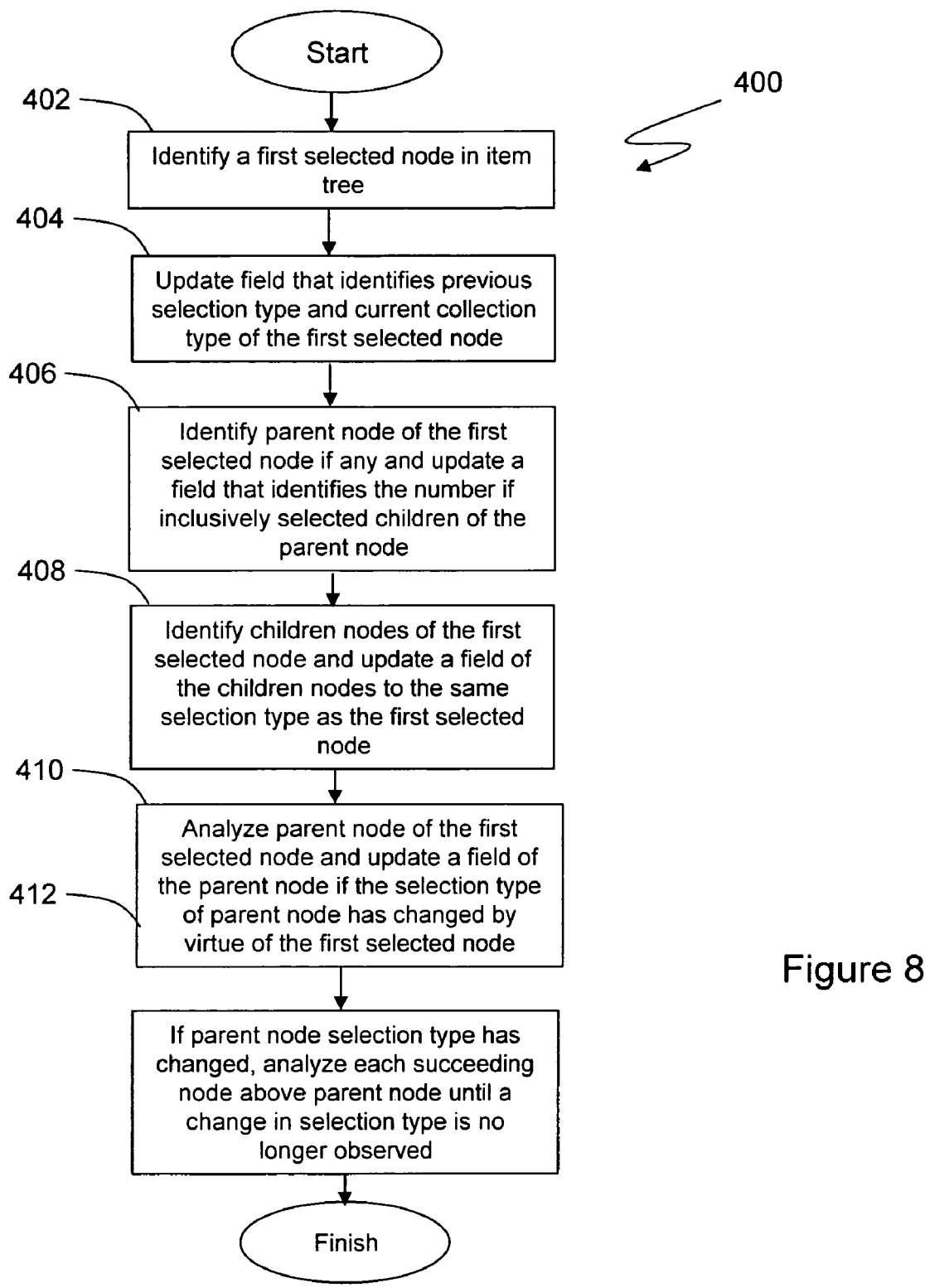
FIG. 8 illustrates an exemplary method of performing an initial analysis of the item tree structure.
Figure 9:
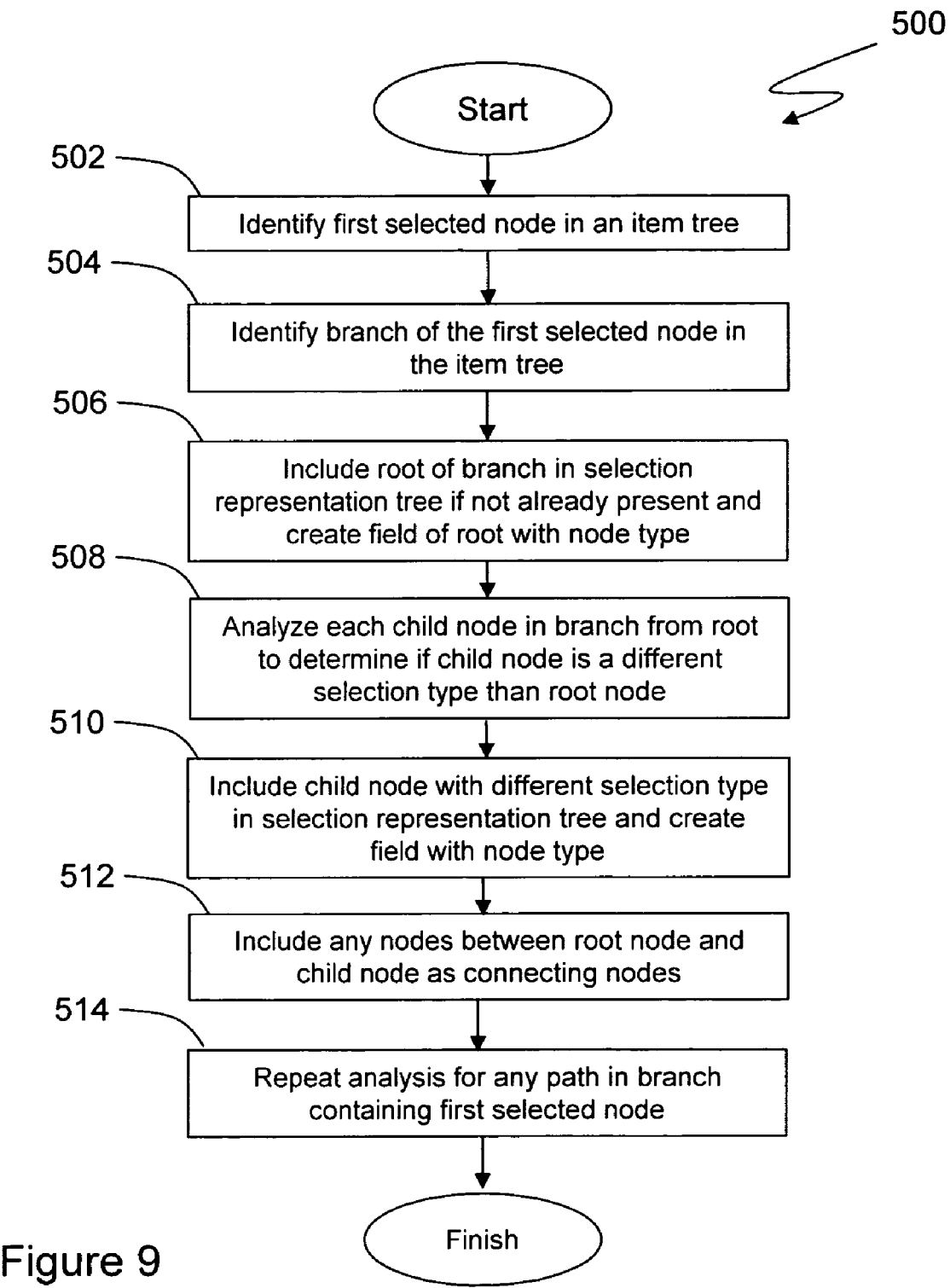
FIG. 9 illustrates an exemplary method of performing real-time construction of a selection representation tree structure.

Assuming that the user is done making selections, the selection representation can be developed from the selection representation tree. Starting from the root of the tree, the selection representation for the example of FIGS. 7A through 7J will be:
 INCLUDE AA:
 EXCLUDE AA:\BB
 INCLUDE AA:\BB\II
 EXCLUDE AA:\CC\JJ
 EXCLUDE AA:\DD\MM Exemplary methods for performing the analysis of the item tree and creating and updating the selection representation tree are illustrated in FIGS. 8 and 9. As shown in FIG. 8, method 400 relates to identifying selections in an item tree. In one embodiment, the item tree is able to correlate the following for each node: the number of children for each node, the previous and current selection type for each node, and the number of inclusively-selected selected children for each node. In an item tree where none of the nodes have yet been selected, initially, the current selection type for each node is set to be exclusively selected and the number of inclusively-selected children is zero for each node.

At 402, selection module 138 identifies a first selected node in the item tree. At 404, the selection module 138 stores in a field corresponding to the first selected node the previous selection type as well as the current selection type of the first selected node. At 406, selection module 138 identifies a parent node of the first selected node, if any, and increments a field of the parent node with the number of inclusively selected children for the parent node. (Note, that if the user positively unselects a node, then the selection module 128 may actually be decrementing the number of inclusively selected children). At 408, the selection module 138 identifies children nodes of the first selected node, if any, and sets a selection type field of the children nodes to the same selection type as the first selected node.

At 410, the selection module 138 walks up to the parent node of the first selected node to determine if the selection type has changed by virtue of the current selection of the first selected node. If the selection type of the parent node has changed, then such change will be notated in a field corresponding to the parent node. At 414, if the selection type of the parent node has changed, the selection module 138 walks up the branch to succeeding nodes of the branch toward the root until it finds a node whose selection type has not changed by the selection of the first selected node. In each case of the selection type changing, the selection module 138 updates a field to include the new selection type.

As shown in FIG. 9, method 500 relates to creating a selection representation tree. That is, in one embodiment, a selection representation tree does not exist until a user makes a first selection in the item tree. In one embodiment, the selection representation tree can correlate a node type with each node in branches that are to eventually be included in the selection representation. A node type indicates whether a node is an inclusively selected node (or inclusive node), an exclusively selected node (or exclusive node), or a connecting node. The three different node types were depicted graphically in the examples of FIGS. 7A through 7J. However, in the following discussion, the node type is indicated in a field associated with a particular node in a branch. At 502, selection module 138 identifies a first selected node in an item tree. At 504, the selection module 138 identifies the branch of the first selected node in the item tree.

At 506, the selection module 138 starts at the root node of the branch and includes the root node in the selection representation tree along with creating a corresponding field with the root's node type. For example, if the root node is inclusively selected, then the field will indicate that the root node is inclusively selected. However, if the root node is exclusively selected and is a connecting node to another inclusively selected node, then the field will indicate the root node is a connecting node.

At 508, the selection module 138 analyzes the children node of the root node in the same branch as the first selected node to determine the first of the child nodes that is a different selection type than the root node. At 510, if a child node of the root node in the branch of the first selected node is a different selection type than the root node, selection module 138 adds the child node to the selection representation tree with the appropriate node-type indicator in a field created for that node. At 512, any other children nodes in between the root node and the first child node with different selection type are included in the selection representation tree as a connecting node.

By way of example, at 508, if the root node is an inclusive selection type, then the root node will be included in the selection representation tree and have a corresponding field indicating that the root node is an inclusive node type. Then, at 510, the next child node along the branch that is an exclusive selection type is included in the selection representation tree with a field indicating exclusive node type. At 512, any nodes between the root node and the exclusive child node, if any, are included in the selection representation as connecting nodes.

Conversely, at 508, if the root node is an exclusive selection type, the root node will be included in the selection representation tree as a connecting node. At 510, the next child node along the branch that is an inclusive selection type is included in the selection representation tree with a field indicating it is an inclusive node. At 512, any nodes between the root node and the inclusive child node, if any, are included in the selection representation as connecting nodes.

At 514, the analysis proceeds for each node in the branch of paths that contains the first selected node to determine if any of the nodes are a different selection type from the previously identified selection type until there are no more changes in selection type along a particular path. The last node to be included along any path is the last identified change in selection type. The length of the analysis, of course, depends on how many paths are in the branch that include the first selected node. Thus, the analysis may occur in only a root node, or many occur down multiple nodes along a branch.

Figure 10:
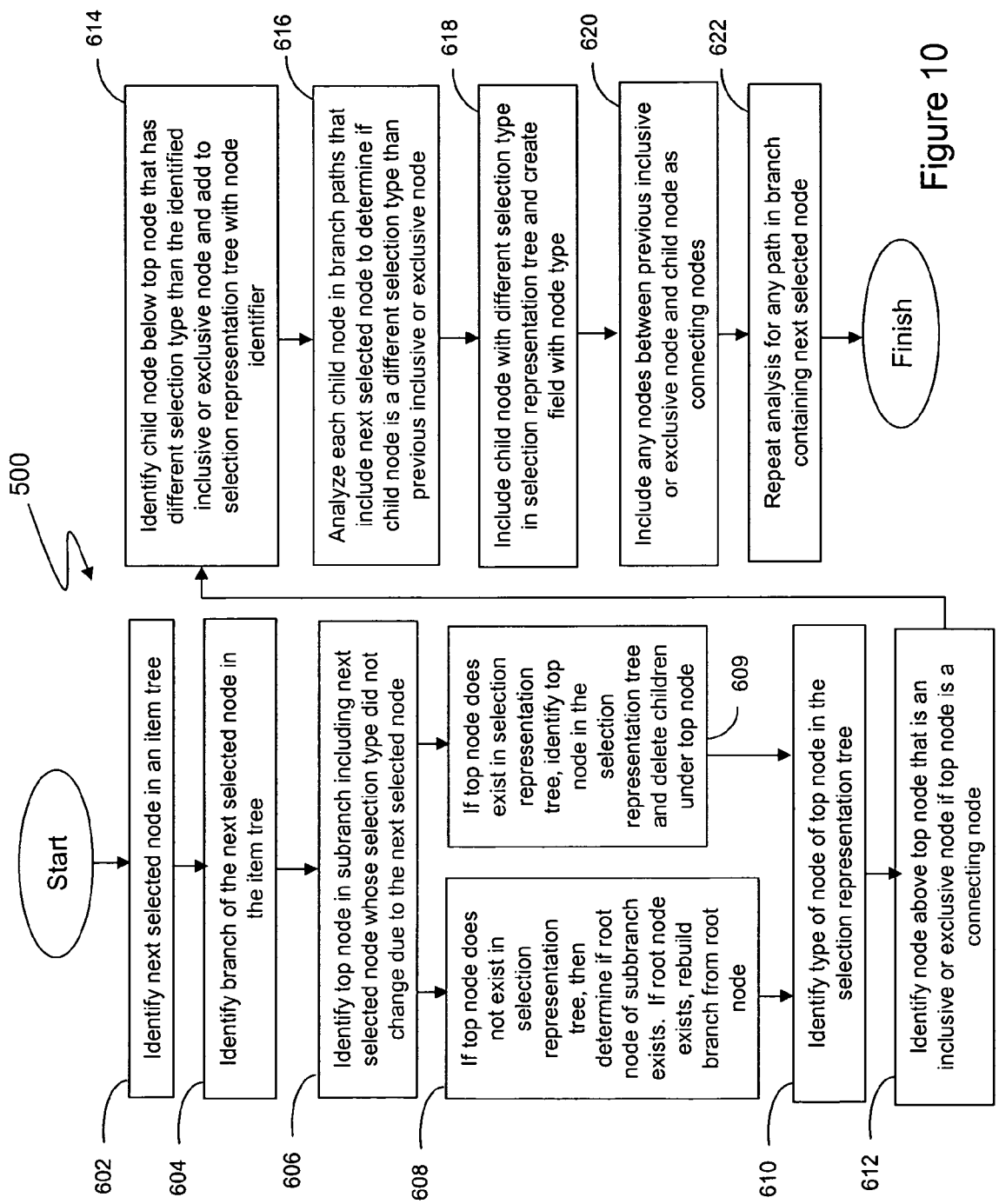
FIG. 10 illustrates an exemplary method of performing real-time construction of a selection representation tree structure.

FIG. 10 illustrates an exemplary method 600 for updating a selection representation tree. At 602, selection module 138 identifies the next selected node in an item tree. At 604, the selection module 138 identifies the branch of the next selected node in the item tree. At 606, the selection module 138 uses the analysis of the item tree above to determine the top node in the branch whose selection type has not changed due to the first selected node. Thus, a subbranch is identified with the top node and the nodes below the top node.

At 608, if the top node does not exist in the selection representation tree, then selection module 138 builds the branch starting from the root node in the selection representation tree, assuming that the root node is the same root node of the branch of the next selected module. Thus, selection module 138 will repeat steps 506 through 514 of method 500. If the branch does not include an existing root node in the selection representation tree, then the selection module 138 will create a second selection representation tree beginning at step 502 of method 500.

At 609, if the top node already exists in the selection representation tree, at 608, the selection module 138 finds that existing top node in the selection representation tree and deletes the child nodes below it.

At 610, the selection module 138 identifies whether the top node is inclusive, exclusive or a connecting node. At 612, if the top node is a connecting node, the selection module 138 traverses up the branch toward the root to identify the next inclusive or exclusive node. Once an exclusive or inclusive node is identified (whether it be the top node or a node above it), at 614, the selection module 138 identifies a child node in the branch below the identified exclusive or inclusive node that is a different selection type and adds the child node to the selection representation tree with the appropriate node-type indicator.

At 616, the selection module 138 analyzes the children node therebelow to determine which of the child nodes has a different selection type than the previous inclusive or exclusive node. At 618, if a child node is a different selection type, selection module 138 adds the child node to the selection representation tree with the appropriate node-type indicator. At 620, any other children nodes in between the previous inclusive or exclusive node and the next inclusive or exclusive child node are included in the selection representation tree as a connecting node.

At 622, the analysis proceeds for each node in the branch of paths that contains the next selected node to determine if any of the nodes are a different selection type from the previously identified selection type until there are no more changes in selection type along a particular path. The last node to be included along any path is the last identified change in selection type. The length of the analysis, of course, depends on how many paths are in the branch that include the next selected node.

Using the foregoing exemplary method, a selection representation tree will result in which along any branch of the tree structure, the explicit nodes should alternate between inclusive node type and exclusive node type along each branch with connecting nodes in between changes in selection type because the process analyzes each node of the branch in terms of whether the child node is a different selection type than the parent node from which the child node depends. It will be appreciated that the selection representation tree could actually be a sub-set of the item tree by allowing an additional field for each node to identify a node-type which is maintained simultaneously with the other fields of the item tree.

Thus, every time the user makes a selection in the item tree, the item tree is traversed, starting with the selected node, up to the last parent whose selection type is affected by the selection. This branch of the parent node is then created or updated in the selection representation tree using the selection tree rules exemplarily set forth in FIGS. 9 and 10. This method utilizes a bottom-up approach to update the selection representation tree in real-time and limits the reconstructions to the selection representation tree, instead of reconstructing the item tree every time a selection is made, providing a very efficient way to follow the user's changes and ultimately construct a selection representation The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computer system including a memory and processor that uses a first tree structure for displaying data, each node of the first tree structure being definable by a path, a method for creating a selection representation of selected items in the first tree structure, the method comprising:

analyzing a first parent node of the first tree structure to determine whether more than half but less than all of children nodes of the first parent node are positively selected or implicitly inclusively selected;

categorizing the first parent node as an inclusive selection if more than half but less than all of children nodes of the first parent node are positively selected or implicitly inclusively selected;

updating a field of the first parent node with a first node type indicator if the first parent node is an inclusive selection;

analyzing a first child node of the first parent node to determine if the first child node is a different selection type than the first parent node;

updating a field of the first child node with a second node type indicator if the first child node is a different selection type than the first parent node;

generating a selection representation of the first parent node and the children nodes of the first parent node based on the node type indicator of the first parent nodes and children nodes of the first parent node; and storing the selection representation in the memory.

2. The method as recited in claim 1, wherein the field of the first parent node and the field of the first child node are maintained in a separate tree structure than the first tree structure.

3. The method as recited in claim 1, wherein if the first parent node is an inclusive selection, then the first node type indicator is an inclusive node type indicator, and wherein if the first child node is a different selection type than the first parent node, then the second node type indicator is an exclusive node type indicator.

4. The method as recited in claim 1, wherein if the first parent node is an exclusive selection, then the first node type indicator is a connecting node type indicator, and wherein if the first child node is a different selection type than the first parent node, then the second node type indicator is an inclusive node type indicator.

5. The method as recited in claim 1, wherein if both the first parent node and first child node are inclusive selection types, then the first node type indicator is an inclusive node type indicator and the second node type indicator is a connecting node type indicator.

6. The method as recited in claim 1, wherein if both the first parent node and the first child node are exclusive selection types, then the first node type indicator is a connecting node type indicator and the second node type indicator is a connecting node type indicator.

7. The method as recited in claim 1, wherein the first parent node is an exclusive selection if at least one of the following exists:
the first parent node is unselected;
more than half of the children nodes of the first parent node are positively unselected; or
more than half of the children nodes of the first parent node are implicitly exclusively selected.

8. The method as recited in claim 1, further comprising performs an initial analysis of the first tree structure, wherein the initial analysis comprises at least one of:
identifying a positively selected node, wherein the positively selected node is one of the first parent node or the first child node;
updating a field of the positively selected node to with an inclusive selection type indicator;
determining whether any of the nodes above the positively selected node in a path to a root node have changed selection type due to the positively selected node; or
updating a field of any of the nodes above the positively selected node that have changed selection type with the previous selection type and the current selection type.

9. A computer system including a processor and memory for generating a selection representation of items selected in a first tree structure, the computer system comprising:
a file system that stores data using a hierarchy;
a graphical user interface that interacts with the file system to present the data in the first tree structure to reflect the hierarchy of the data in the file system and receives input from a user of at least one of:
positive selections from a user of various items in the first tree structure for performing a predetermined function on the positively selected items; or
positive unselections from a user of various items in the first tree structure for excluding from performing a predetermined function on the positively unselected items; and
a selection module programmed to use the input of the user and generate a election representation, the selection module operative to:
analyze a first parent node of the first tree structure to determine whether more than half but less than all of children nodes of the first parent node are positively selected or implicitly inclusively selected;
categorize the first parent node as an inclusive selection if more than half but less than all of children nodes of the first parent node are positively selected or implicitly inclusively selected;
update a field of the first parent node with a first node type indicator if the first parent node is an inclusive selection;
analyze a first child node of the first parent node to determine if the first child node is a different selection type than the first parent node;
update a field of the first child node with a second node type indicator if the first child node is a different selection type than the first parent node;
generate a selection representation of the first parent node and the children nodes of the first parent node based on the node type indicator of the first parent nodes and children nodes of the first parent node; and
store the selection representation in the memory.

10. The computer system as recited in claim 9, wherein the selection module further performs an initial analysis of the first tree structure, the initial analysis comprising at least one of:
identifying a positively selected node, wherein the positively selected node is one of the first parent node or the first child node;
updating a field of the positively selected node to with an inclusive selection type indicator;
determining whether any of the nodes above the positively selected node in a path to a root node have changed selection type due to the positively selected node; or
updating a field of any of the nodes above the positively selected node that have changed selection type with the previous selection type and the current selection type.

11. The computer system as recited in claim 9, further comprising an application program that communicates with the selection module for performing a predetermined function on the items in the selection representation.

12. The computer system as recited in claim 9, wherein the application program is a backup application.

13. In a computer system including a memory and processor having a graphical user interface including a display and a selection device, a method of providing and selecting items in a first tree structure on the display, the method comprising:
retrieving a first tree structure that reflects a hierarchy of data from at least one of memory or storage;
displaying the first tree structure on the display;
receiving input from a user of at least one of:
positive selections from a user of various items in the first tree structure for performing a predetermined function on the positively selected items; or
positive unselections from a user of various items in the first tree structure for excluding from performing a predetermined function on the positively unselected items;
analyzing a first parent node of the first tree structure to determine whether more than half but less than all of children nodes of the first parent node are positively selected or implicitly inclusively selected;
categorizing the first parent node as an inclusive selection if more than half but less than all of children nodes of the first parent node are positively selected or implicitly inclusively selected;
updating a field of the first parent node with a first node type indicator if the first parent node is an inclusive selection;
analyzing a first child node of the first parent node to determine if the first child node is a different selection type than the first parent node;
updating a field of the first child node with a second node type indicator if the first child node is a different selection type than the first parent node;
generating a selection representation of the first parent node and the children nodes of the first parent node based on the node type indicator of the first parent nodes and children nodes of the first parent node; and
storing the selection representation in the memory.

14. The method as recited in claim 13, wherein if the first parent node is an inclusive selection, then the first node type indicator is an inclusive node type indicator, and wherein if the first child node is a different selection type than the first parent node, then the second node type indicator is an exclusive node type indicator.

15. The method as recited in claim 13, wherein if the first parent node is an exclusive selection, then the first node type indicator is a connecting node type indicator, and wherein if the first child node is a different selection type than the first parent node, then the second node type indicator is an inclusive node type indicator.

16. The method as recited in claim 13, wherein if both the first parent node and first child node are inclusive selection types, then the first node type indicator is an inclusive node type indicator and the second node type indicator is a connecting node type indicator.

17. The method as recited in claim 13, wherein if both the first parent node and the first child node are exclusive selection types, then the first node type indicator is a connecting node type indicator and the second node type indicator is a connecting node type indicator.

18. The method as recited in claim 13, wherein the first parent node is an exclusive selection if at least one of the following exists:
   the first parent node is unselected;
   more than half of the children nodes of the first parent node are positively unselected; or
   more than half of the children nodes of the first parent node are implicitly exclusively selected.

19. The method as recited in claim 13, further comprising performs an initial analysis of the first tree structure, wherein the initial analysis comprises at least one of:
   identifying a positively selected node, wherein the positively selected node is one of the first parent node or the first child node;
   updating a field of the positively selected node to with an inclusive selection type indicator;
   determining whether any of the nodes above the positively selected node in a path to a root node have changed selection type due to the positively selected node; or
   updating a field of any of the nodes above the positively selected node that have changed selection type with the previous selection type and the current selection type.

20. The method as recited in claim 13, wherein the field of the first parent node and the field of the first child node are maintained in a separate tree structure than the first tree structure.

\* \* \* \* \*